(«12») United States Patent
Mizoguchi

(10) Patent No.: US 8,917,435 B2
(45) Date of Patent: Dec. 23, 2014

(54) OPTICAL SCANNER AND IMAGE FORMING APPARATUS

(71) Applicant: Seiko Epson Corporation, Tokyo (JP)

(72) Inventor: Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/186,251

(22) Filed: Feb. 21, 2014

(65) Prior Publication Data

US 2014/0168736 A1  Jun. 19, 2014

Related U.S. Application Data

(62) Division of application No. 13/031,677, filed on Feb. 22, 2011, now Pat. No. 8,699,112.

(30) Foreign Application Priority Data

Feb. 23, 2010  (JP) .................................. 2010-037997

(51) Int. Cl.
 *G02B 26/08* (2006.01)
 *G02B 26/10* (2006.01)

(52) U.S. Cl.
 CPC ............ *G02B 26/101* (2013.01); *G02B 26/085* (2013.01); *Y10S 359/904* (2013.01)
 USPC ....................................... 359/224.1; 359/904

(58) Field of Classification Search
 CPC ............. G02B 26/0841; G02B 26/105; G02B 26/085; G02B 26/101
 USPC .......... 359/198.1–199.4, 200.6–200.8, 202.1, 359/221.2, 223.1–225.1, 226.2, 904, 359/290–295, 838, 846, 871, 872; 250/204, 250/559.06, 559.29, 230, 234; 347/255–260; 353/39, 98–99; 385/15–18, 22; 398/12, 19, 45; 1/198.1–199.4, 200.6–200.8, 202.1, 1/221.2, 223.1–225.1, 226.2, 904, 1/290–295, 838, 846, 871, 872
 See application file for complete search history.

(56) References Cited

U.S. PATENT DOCUMENTS

| | | | |
|---|---|---|---|
| 5,912,608 A | 6/1999 | Asada | |
| 6,480,320 B2 | 11/2002 | Nasiri | |
| 6,632,373 B1 | 10/2003 | Rosa et al. | |
| 6,679,055 B1 * | 1/2004 | Ellis | ................................ 60/527 |

(Continued)

FOREIGN PATENT DOCUMENTS

| | | |
|---|---|---|
| JP | 08-322227 A | 12/1996 |
| JP | 2002-162582 A | 6/2002 |

(Continued)

*Primary Examiner* — Jennifer L. Doak
(74) *Attorney, Agent, or Firm* — Harness, Dickey & Pierce, P.L.C.

(57) ABSTRACT

An optical scanner includes: a light reflecting section having light reflectivity; a movable plate which includes the light reflecting section and can be displaced; four link sections connected to the movable plate; and a supporting section supporting the four link sections. The four link sections are provided on an outer circumference of the movable plate at 90-degree intervals along a circumferential direction of the movable plate in a plan view. Each link section includes a turnable drive section, and a shaft section which connects the movable plate and the drive section. The shaft section is bent and deformed in a thickness direction of the movable plate by turning the drive section.

7 Claims, 18 Drawing Sheets

(56) References Cited

U.S. PATENT DOCUMENTS

| | | |
|---|---|---|
| 7,295,726 B1 | 11/2007 | Milanovic et al. |
| 7,428,353 B1 | 9/2008 | Milanovic et al. |
| 2002/0012180 A1 | 1/2002 | Yu et al. |
| 2008/0061026 A1 | 3/2008 | Milanovic et al. |
| 2009/0039716 A1 | 2/2009 | Ogawa et al. |
| 2009/0261688 A1 | 10/2009 | Xie et al. |
| 2010/0277783 A1 | 11/2010 | Takahashi |
| 2011/0205609 A1 | 8/2011 | Mizoguchi |

FOREIGN PATENT DOCUMENTS

| | | |
|---|---|---|
| JP | 2005-181395 A | 7/2005 |
| JP | 2009-058930 A | 3/2009 |
| JP | 2010-286609 A | 12/2010 |
| WO | WO-2009-087883 A1 | 7/2009 |

* cited by examiner

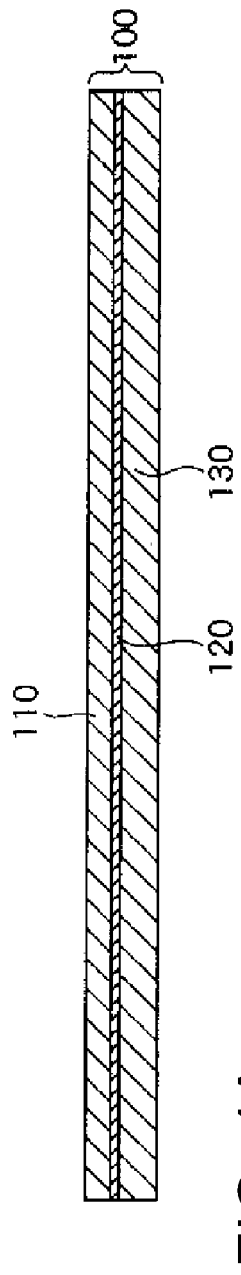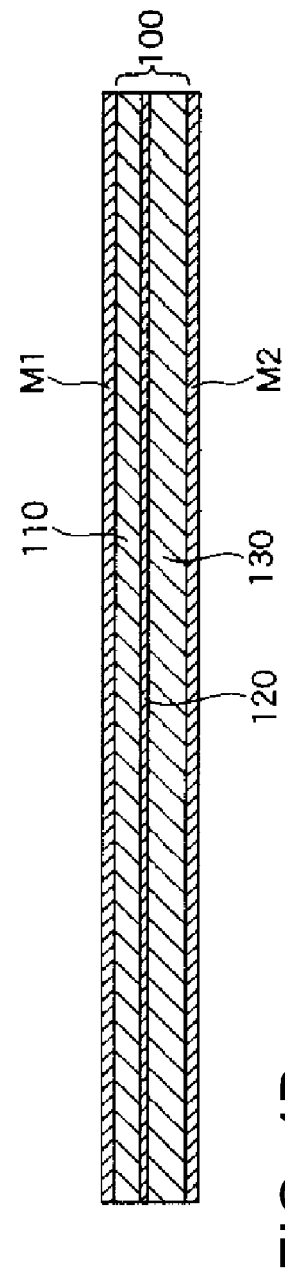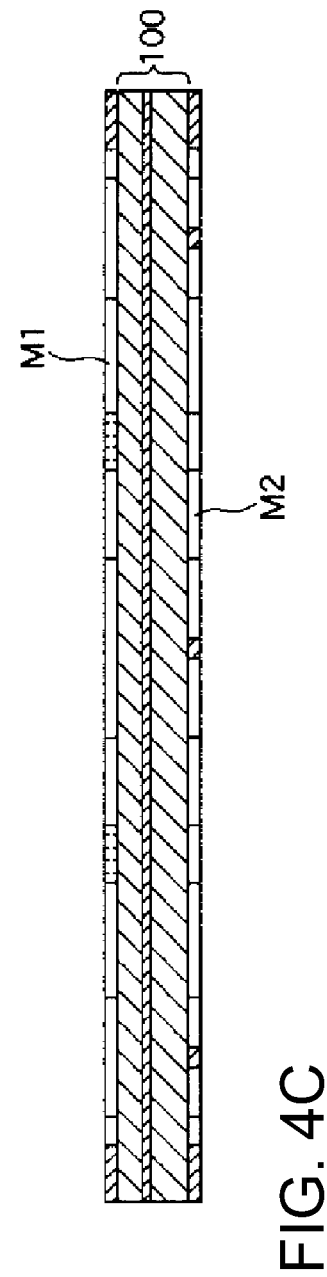

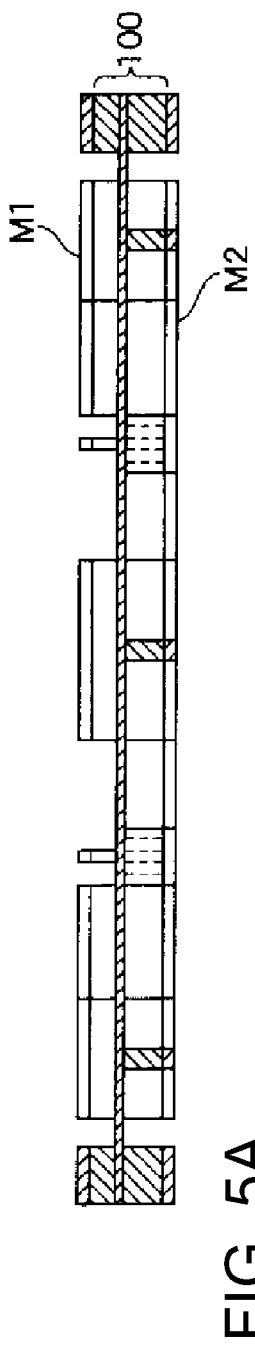
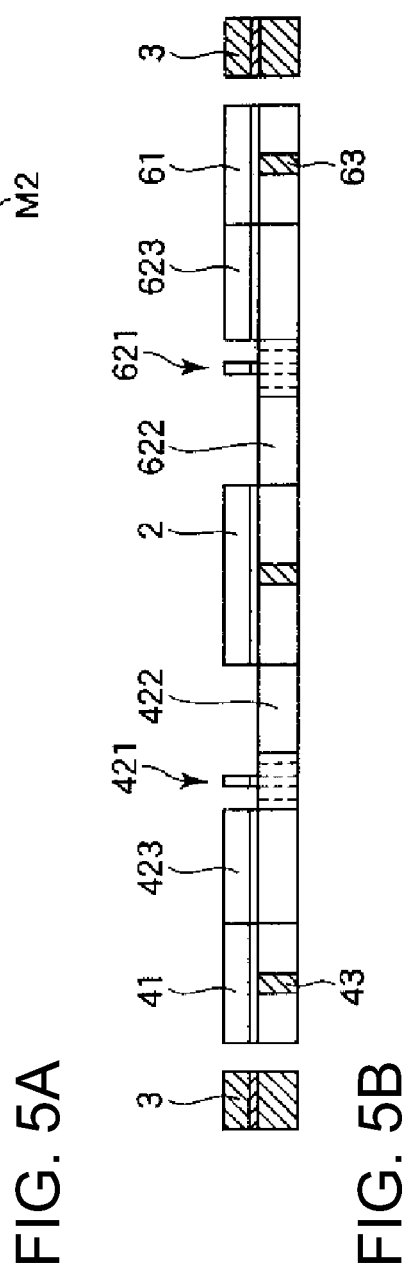
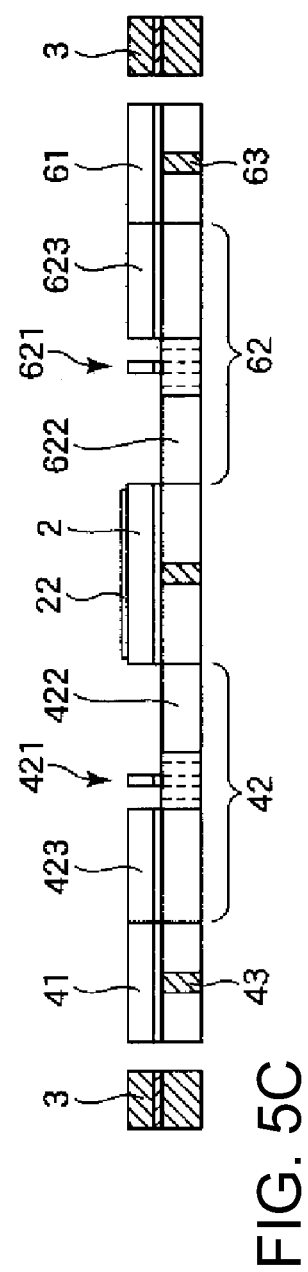
FIG. 5A
FIG. 5B
FIG. 5C

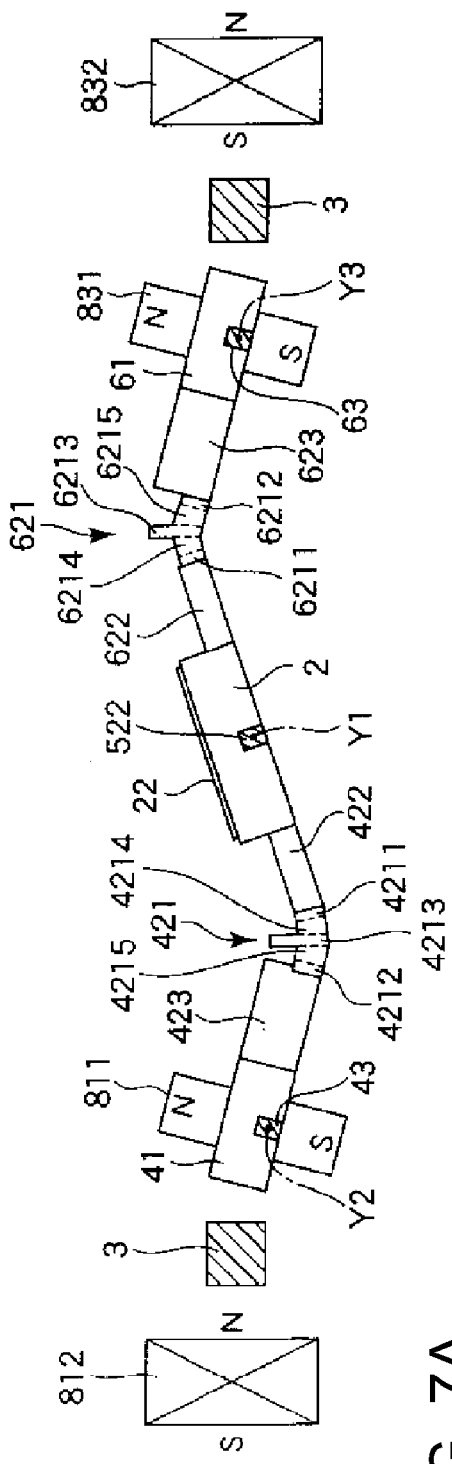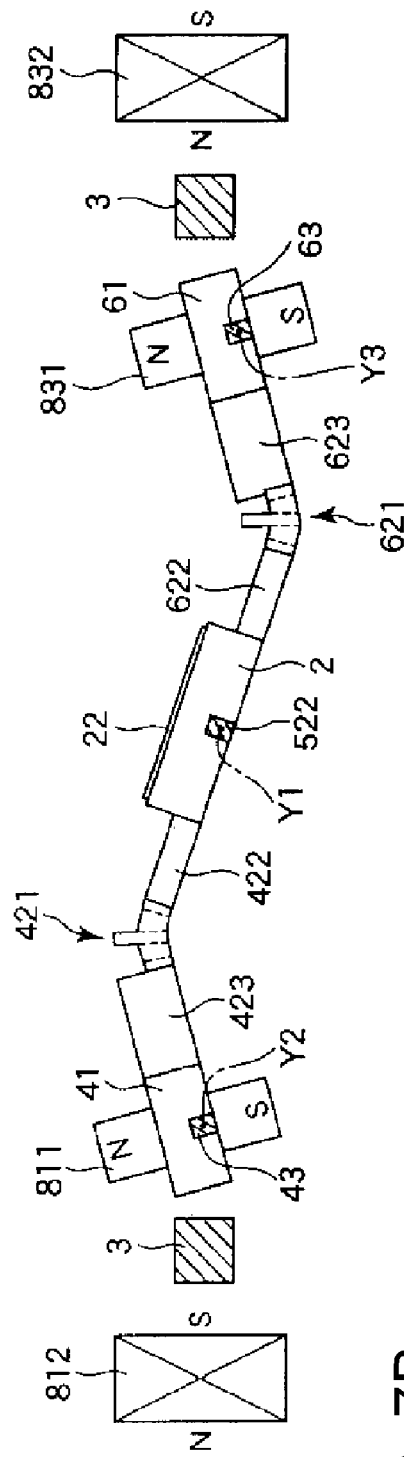
FIG. 7A
FIG. 7B

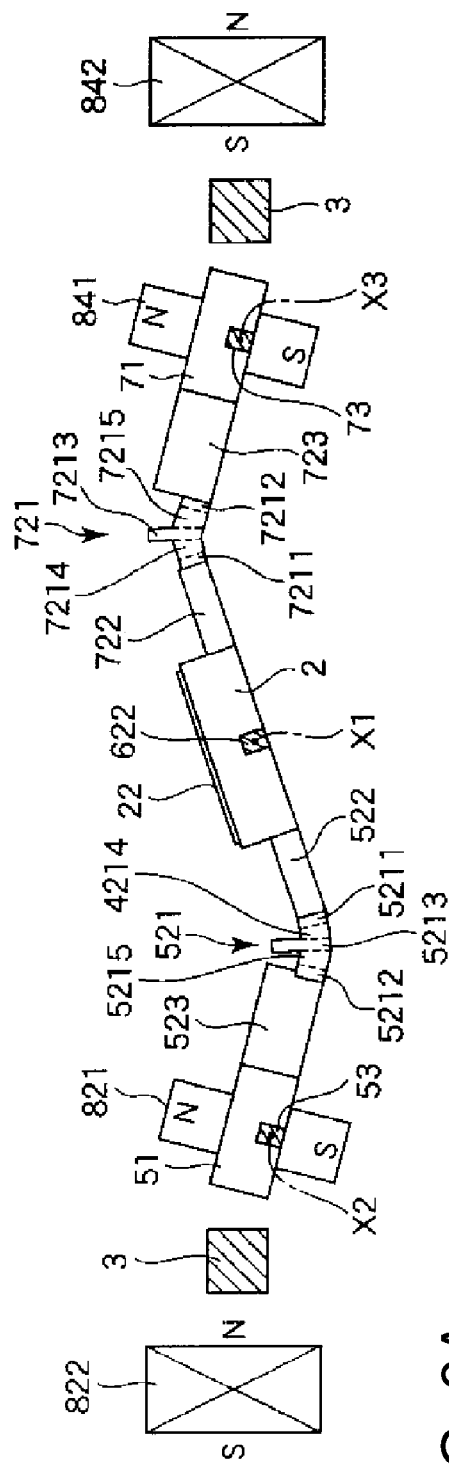
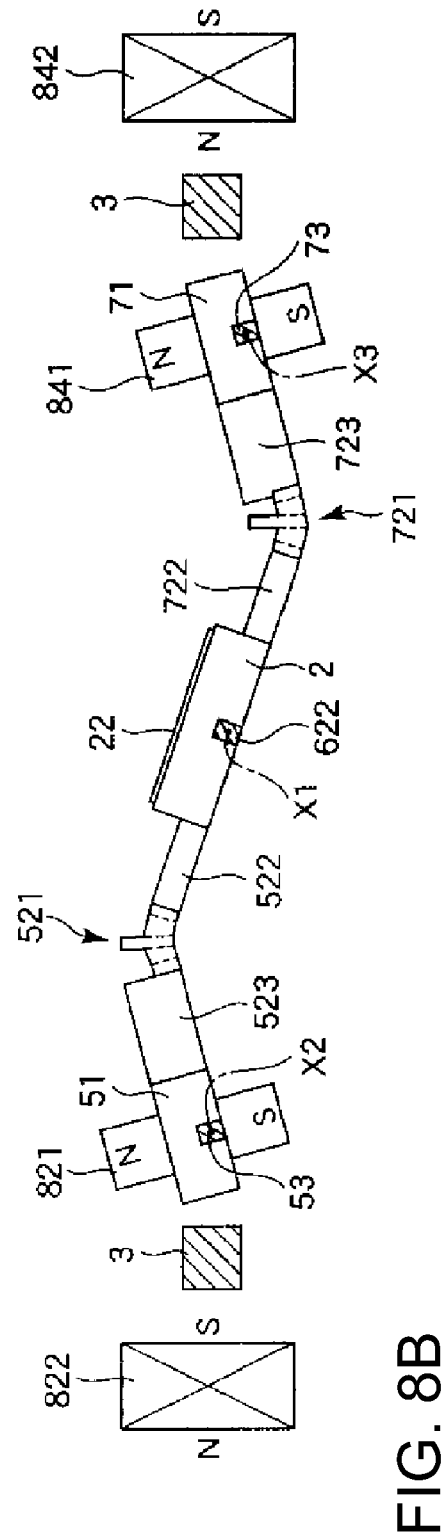
FIG. 8A
FIG. 8B

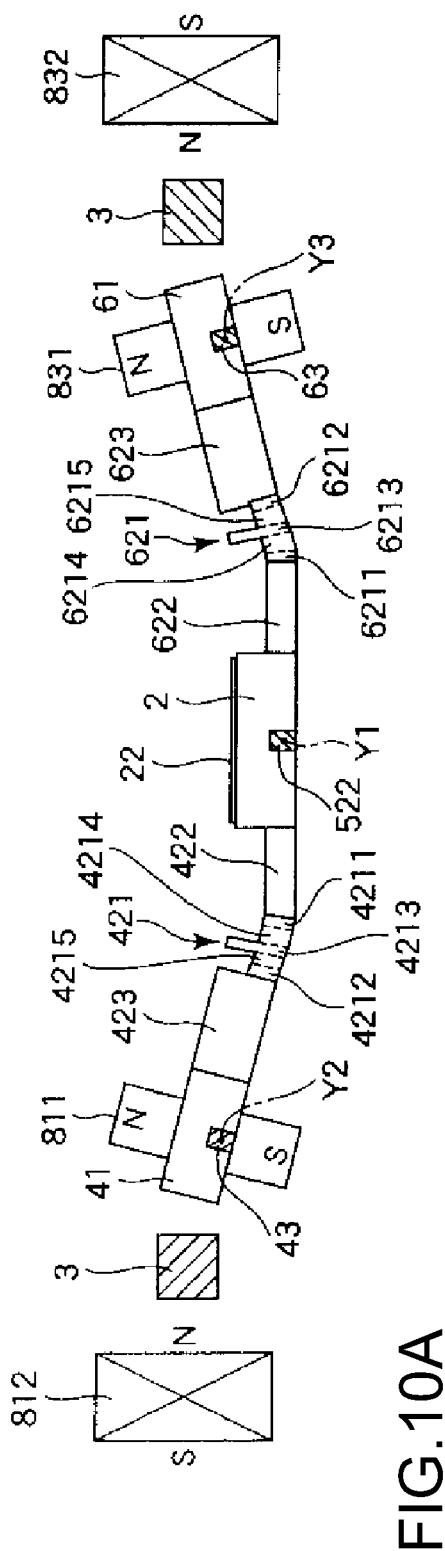
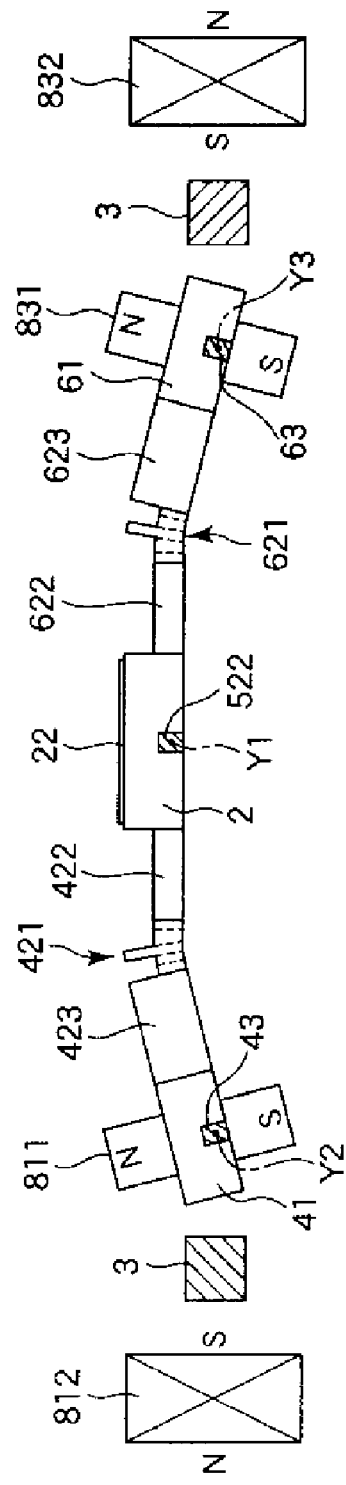
FIG.10A
FIG.10B

OPTICAL SCANNER AND IMAGE FORMING APPARATUS

CROSS-REFERENCE TO RELATED APPLICATIONS

This application is a divisional patent application of U.S. application Ser. No. 13/031,677 filed Feb. 22, 2011, which claims priority to Japanese Patent Application No. 2010-037997 filed Feb. 23, 2010 all of which are hereby expressly incorporated by references herein in their entireties.

BACKGROUND

1. Technical Field

The present invention relates to optical scanners and image forming apparatuses.

2. Related Art

One known example of an optical scanner for drawing by optical scanning in a laser printer or the like is formed of a torsion oscillator and uses an actuator (see, for example, JP-A-2005-181395).

In JP-A-2005-181395, an actuator has an insulated substrate in which a pair of permanent magnets is provided. Further, a scanner main body is supported by the insulated substrate between the pair of permanent magnets. The scanner main body has a frame-shaped supporting section, a frame-shaped outside movable plate inside the supporting section, and an inside movable plate (mirror) inside the outside movable plate. The outside movable plate is connected to a supporting section via a pair of first torsion bars extending in an X-axis direction, and the inside movable plate is connected to the outside movable plate via a second torsion bar extending in a Y-axis direction perpendicular to the X-axis direction. Finally, the outside movable plate and the inside movable plate each have a coil.

In the actuator structured as described above, by the action of the magnetic fields produced from the coils and the magnetic field produced between the pair of permanent magnets by energization, the outside movable plate turns about the X axis with the inside movable plate by using the first torsion bar as a central axis, and the inside movable plate turns about the Y axis by using the second torsion bar as a central axis.

As described above, in the actuator of JP-A-2005-181395, the mechanism which turns the inside movable plate about the X axis and the mechanism which turns the inside movable plate about the Y axis differ from each other. This makes it impossible to turn the inside movable plate about the X axis and the Y axis under the same conditions. In addition, in the actuator of JP-A-2005-181395, the magnetic field produced from the coil in the outside movable plate and the magnetic field produced from the coil in the inside movable plate interfere with each other, making it impossible to turn the inside movable plate about the X axis and the Y axis independently. Thus, in the actuator of JP-A-2005-181395, it is impossible to turn the inside movable plate about the X axis and the Y axis with stability.

SUMMARY

An advantage of some aspects of the invention is to provide an optical scanner and an image forming apparatus which can turn a movable plate about two axes which are at right angles to each other with stability.

An aspect of the invention is directed to an optical scanner including: a movable plate including a light reflecting section having light reflectivity; a supporting section supporting the movable plate; and four link sections connecting the movable plate and the supporting section. The four link sections are provided on an outer circumference of the movable plate at 90-degree intervals along a circumferential direction of the movable plate in a plan view. Each link section has a drive section spaced apart from the movable plate and is turnable with respect to the supporting section, and a shaft section connecting the movable plate and the drive section. The shaft section of each link section is bent and deformed in a thickness direction of the movable plate by turning the drive section in a midpoint of the direction in which the drive section is placed.

As a result, it is possible to independently turn the movable plate about each of two axes which are at right angles to each other. This makes it possible to provide an optical scanner which can turn the movable plate about two axes which are at right angles to each other with stability.

In the optical scanner according to the aspect of the invention, two axes which are at right angles to each other in a plan view of the movable plate are an X axis and a Y axis. Further, the four link sections have: a first link section and a second link section which face each other in an X-axis direction with the movable plate therebetween; and a third link section and a fourth link section which face each other in a Y-axis direction with the movable plate therebetween. The first link section and the second link section each have: the drive section spaced apart from the movable plate in the X-axis direction, a first shaft section connecting the movable plate and the drive section and extending in the X-axis direction, and a second shaft section connecting the drive section and the supporting section and extending in the Y-axis direction. The third link section and the fourth link section each have: the drive section spaced apart from the movable plate in the Y-axis direction, a first shaft section connecting the movable plate and the drive section and extending in the Y-axis direction, and a second shaft section connecting the drive section and the supporting section and extending in the X-axis direction.

This simplifies the structure of each link section, and makes it possible to perform turning and the like of the movable plate smoothly about the two axes which face each other.

In the optical scanner according to the aspect of the invention, when an axis which is at a right angle to the X axis and the Y axis is a Z axis, it is preferable that each of the first shaft sections of the four link sections can undergo a first deformation by which the first shaft sections bend so as to be deformed into the shape of a letter V projecting toward one side in a Z-axis direction and a second deformation by which the first shaft sections bend so as to be deformed into the shape of a letter V projecting toward the other side in the Z-axis direction.

By bending the first shaft sections in the manner described above, it is possible to efficiently displace the movable plate.

In the optical scanner according to the aspect of the invention, it is preferable that the movable plate be turned about the Y axis by alternately repeating a state in which the first shaft section of the first link section undergoes the first deformation and the first shaft section of the second link section undergoes the second deformation and a state in which the first shaft section of the first link section undergoes the second deformation and the first shaft section of the second link section undergoes the first deformation, and the movable plate be turned about the X axis by alternately repeating a state in which the first shaft section of the third link section undergoes the first deformation and the first shaft section of the fourth link section undergoes the second deformation and a state in which the first shaft section of the third link section undergoes the second deformation and the first shaft section of the fourth link section undergoes the first deformation.

As a result, it is possible to smoothly turn the movable plate.

In the optical scanner according to the aspect of the invention, it is preferable that the movable plate be vibrated in the Z-axis direction by alternately repeating a state in which the first shaft sections of the link sections undergo the first deformation and a state in which the first shaft sections of the link sections undergo the second deformation.

As a result, it is possible to smoothly vibrate the movable plate.

In the optical scanner according to the aspect of the invention, it is preferable that each of the first shaft sections of the four link sections has: a stress alleviating section provided between the movable plate and the drive section, a movable plate-side shaft section connecting the stress alleviating section and the movable plate, and a drive section-side shaft section connecting the stress alleviating section and the drive section, and that each of the first shaft sections bend at the stress alleviating sections.

As a result, it is possible to alleviate, by the stress alleviating section, the stress placed on the movable plate-side shaft section and to prevent or inhibit the stress from being conveyed to the drive section-side shaft section.

In the optical scanner according to the aspect of the invention, it is preferable that each of the movable plate-side shaft sections of the four link sections be torsionally deformable about a central axis of the movable plate-side shaft section.

As a result, it is possible to allow the turning of the movable plate about the pair of link sections of the four link sections, the pair of link sections facing each other, by the torsional deformation of the movable plate-side shaft sections of the other pair of link sections. This makes it possible to smoothly turn the movable plate about two axes which are at right angles to each other.

In the optical scanner according to the aspect of the invention, it is preferable that the drive section-side shaft sections of the four link sections be substantially nondeformable as compared to the movable plate-side shaft sections.

As a result, it is possible to efficiently use the stress produced by the turning of the drive section for turning the movable plate. This makes it possible to turn the movable plate at a great turning angle with lower power.

In the optical scanner according to the aspect of the invention, it is preferable that each of the stress alleviating sections of the four link sections have a deformation section extending in a direction perpendicular to an extending direction of the movable plate-side shaft section and the drive section-side shaft section in a plan view of the movable plate, the deformation section being torsionally deformable about a central axis.

As a result, it is possible to effectively alleviate the stress placed on the first shaft section by the torsional deformation of the deformation section.

In the optical scanner according to the aspect of the invention, it is preferable that each of the stress alleviating sections of the four link sections has a pair of deformation sections, and one of the pair of deformation sections be connected to the movable plate-side shaft section, and the other of the pair of deformation sections be connected to the drive section-side shaft section.

As a result, it is possible to effectively alleviate the stress placed on the first shaft section by the torsional deformation of the deformation section.

In the optical scanner according to the aspect of the invention, it is preferable that the stress alleviating sections of the four link sections each have a nondeformable section which is provided between the pair of deformation sections, extends in a direction parallel to an extending direction of the deformation sections, and is torsionally nondeformable about a central axis.

As a result, it is possible to bend the first shaft section at the nondeformable section in each link section. This makes it possible to easily and reliably bend the first shaft section of each link section and to displace the movable plate with stability.

In the optical scanner according to the aspect of the invention, it is preferable that the stress alleviating sections of the four link sections each have a part which alternately extends and meanders in the X-axis direction and in the Y-axis direction.

As a result, it is possible to alleviate, by the stress alleviating section, the stress placed on the movable plate-side shaft section and to prevent or inhibit the stress from being conveyed to the drive section-side shaft section.

In the optical scanner according to the aspect of the invention, it is preferable that the stress alleviating sections of the four link sections each have a plurality of extending sections extending in the X-axis direction and a plurality of extending sections extending in the Y-axis direction, and each of the plurality of extending sections is adapted to torsionally deform about a central axis and bend.

As a result, by making the extending sections undergo at least one of a torsional deformation and bending, it is possible to effectively alleviate the stress placed on the first shaft section.

In the optical scanner according to the aspect of the invention, it is preferable that each of the four link sections be formed of a SOI substrate in which a first Si layer, a $SiO_2$ layer, and a second Si layer are laminated one on top of another in this order.

As a result, it is possible to easily form each link section.

In the optical scanner according to the aspect of the invention, it is preferable that the nondeformable sections, the drive section-side shaft sections, and the drive sections of the four link sections be each formed of the first Si layer, the $SiO_2$ layer, and the second Si layer, and the movable plate-side shaft sections, the deformation sections, and the second shaft sections be each formed only of the second Si layer.

As a result, it is possible to easily form each link section.

In the optical scanner according to the aspect of the invention, it is preferable that the optical scanner further include a displacement unit displacing the movable plate with respect to the supporting section, and that four displacement units be provided, one for each of the four link sections.

As a result, it is possible to independently control the movements of the link sections.

In the optical scanner according to the aspect of the invention, it is preferable that the four displacement units each have a permanent magnet provided in the drive section and a coil producing a magnetic field acting on the permanent magnet.

As a result, the structure of the displacement unit is simplified. Moreover, as a result of electromagnetic driving being performed, it is possible to generate great force.

In the optical scanner according to the aspect of the invention, it is preferable that, in each of the four displacement units, the permanent magnet be provided so that two poles face each other in a thickness direction of the movable plate, and the coil be provided so as to produce a magnetic field in a direction perpendicular to the thickness direction of the movable plate.

As a result, it is possible to displace the movable plate with stability.

In the optical scanner according to the aspect of the invention, it is preferable that each of the permanent magnets of the four displacement units be provided so as to penetrate the drive section.

As a result, it is possible to displace the movable plate with stability.

Another aspect of the invention is directed to an image forming apparatus including a light source and an optical scanner. The optical scanner is provided with a movable plate including a light reflecting section having light reflectivity, a supporting section supporting the movable plate, and four link sections connecting the movable plate and the supporting section. The four link sections are provided on an outer circumference of the movable plate at 90-degree intervals along a circumferential direction of the movable plate in a plan view. Each link section has a drive section spaced apart from the movable plate and turnable with respect to the supporting section, and a shaft section connecting the movable plate and the drive section. The shaft section of each link section is bent and deformed in a thickness direction of the movable plate by turning the drive section in a midpoint of the direction in which the drive section is placed.

As a result, it is possible to independently turn the movable plate about each of two axes which are at right angles to each other. This makes it possible to provide an image forming apparatus which can turn the movable plate about two axes which are at right angles to each other with stability.

BRIEF DESCRIPTION OF THE DRAWINGS

The invention will be described with reference to the accompanying drawings, wherein like numbers reference like elements.

FIGS. 4A to 4C are sectional views showing a method for producing a vibration system of the optical scanner shown in FIG. 1.

FIGS. 5A to 5C are sectional views showing the method for producing the vibration system of the optical scanner shown in FIG. 1.

FIGS. 7A and 7B are diagrams of the driving of the optical scanner shown in FIG. 1.

FIGS. 8A and 8B are diagrams of the driving of the optical scanner shown in FIG. 1.

FIGS. 10A and 10B are diagrams of the driving of the optical scanner shown in FIG. 1.

DESCRIPTION OF EXEMPLARY EMBODIMENTS

Hereinafter, preferred embodiments of an optical scanner and an image forming apparatus of the invention will be described with reference to the accompanying drawings.
First Embodiment First, a first embodiment of the optical scanner of the invention will be described.

Figure 1:
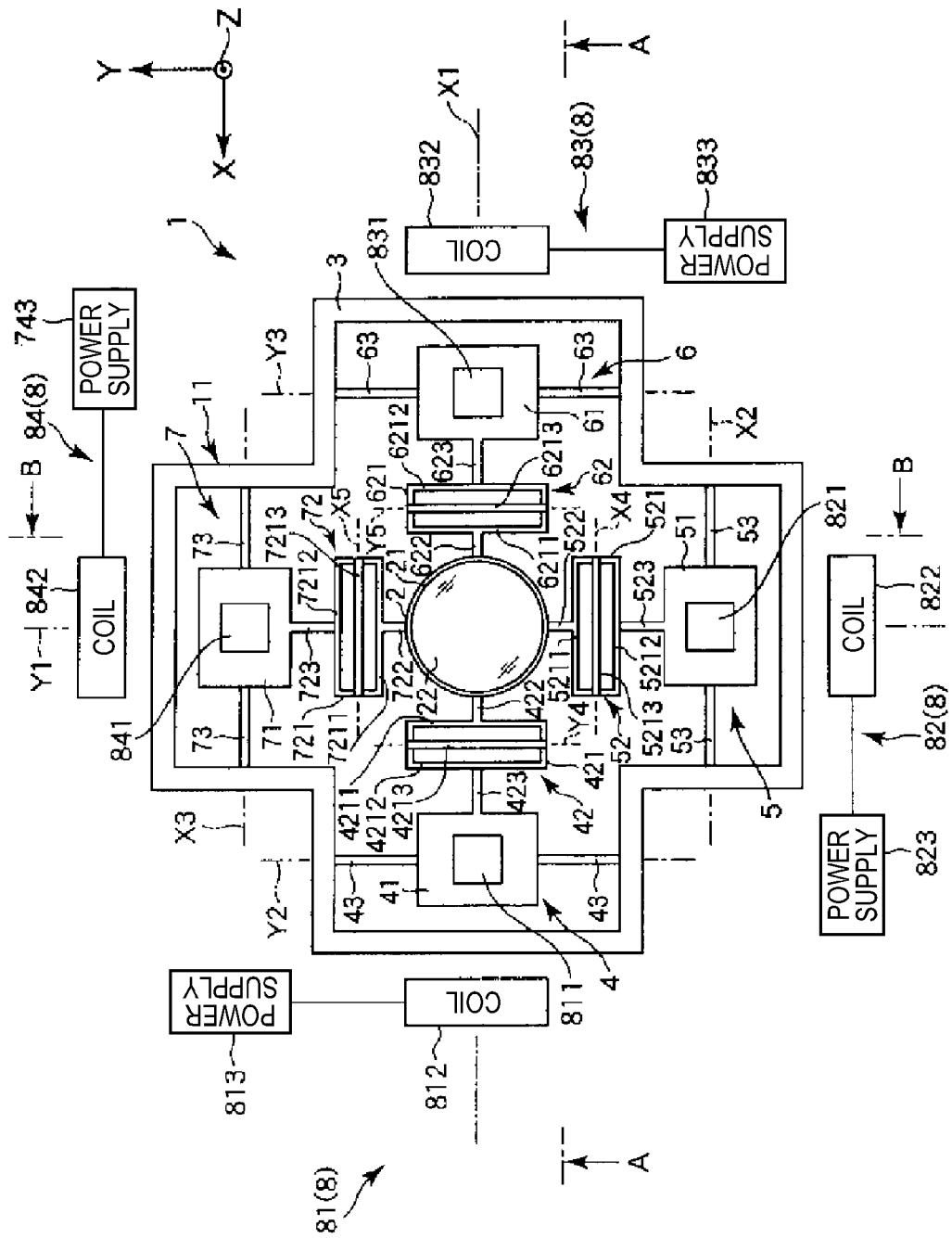
FIG. 1 is a plan view showing a first embodiment of an optical scanner of the invention.
Figure 2:
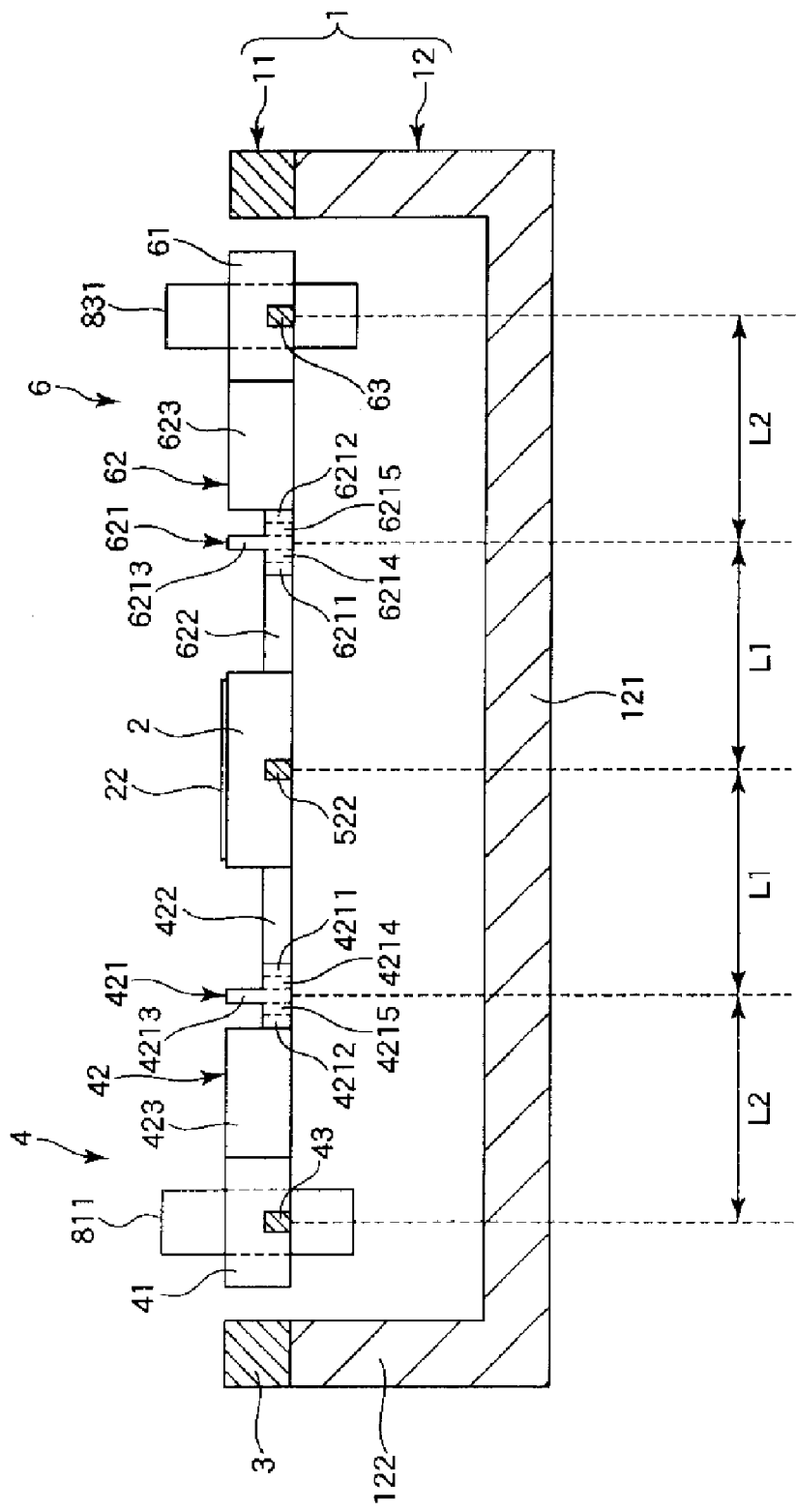
FIG. 2 is a sectional view (a sectional view taken on the line A-A in FIG. 1) of the optical scanner shown in FIG. 1.
Figure 3:
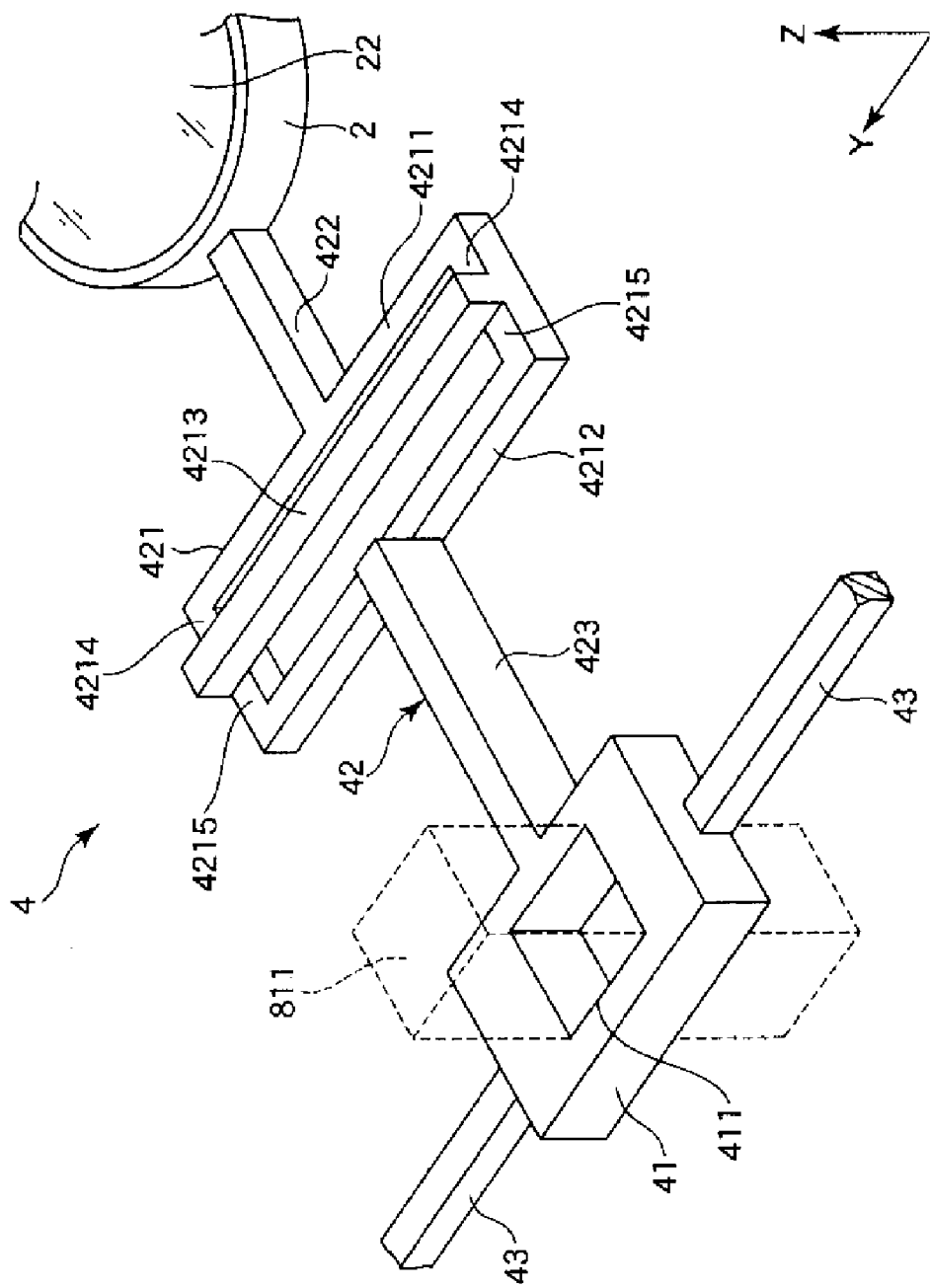
FIG. 3 is a perspective view of a link section of the optical scanner shown in FIG. 1.
Figure 6:
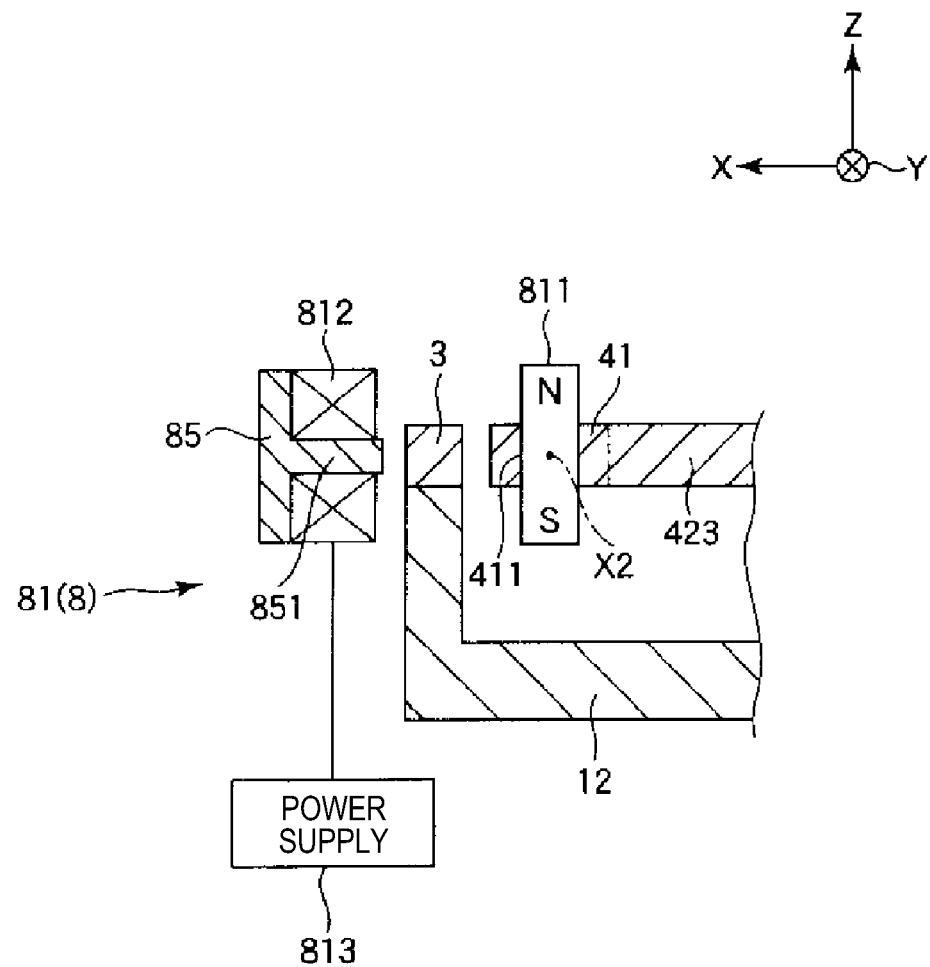
FIG. 6 is a diagram of a displacement unit of the optical scanner shown in FIG. 1.

FIG. 1 is a plan view showing a first embodiment of the optical scanner of the invention, FIG. 2 is a sectional view (a sectional view taken on the line A-A in FIG. 1) of the optical scanner shown in FIG. 1, FIG. 3 is a perspective view of a link section of the optical scanner shown in FIG. 1, FIGS. 4A to 4C and FIGS. 5A to 5C are sectional views of a method for producing a vibration system of the optical scanner shown in FIG. 1, FIG. 6 is a diagram of a displacement unit of the optical scanner shown in FIG. 1, and FIGS. 7A and 7B, FIGS. 8A and 8B, FIG. 9, and FIGS. 10A and 10B are diagrams of the driving of the optical scanner shown in FIG. 1.

Incidentally, in the following description, for convenience of explanation, left and right sides in FIG. 1 are referred to as "left" and "right", respectively, and upper and lower sides in FIGS. 2 to 10 are referred to as "upper" and "lower", respectively. Moreover, the three axes which are at right angles to one another as shown in FIG. 1 are an X axis, a Y axis, and a Z axis, a plane of a movable plate in a non-driven state is coincident with (is parallel to) a plane formed of the X axis and the Y axis, and a thickness direction of the movable plate is coincident with the Z axis. Furthermore, hereinafter, a direction parallel to the X axis is referred to as an "X-axis direction", a direction parallel to the Y axis is referred to as a "Y-axis direction", and a direction parallel to the Z-axis is referred to as a "Z-axis direction".

The optical scanner 1 shown in FIGS. 1 and 2 includes a vibration system 11 formed of a movable plate 2, a supporting section 3 supporting the movable plate 2, and four link sections 4, 5, 6, and 7 connecting the movable plate 2 and the supporting section 3, a pedestal 12 supporting the vibration system 11, and a displacement unit 8 displacing the movable plate 2. Hereinafter, components of the optical scanner 1 will be described sequentially in detail.

1-1. Vibration System 11

In this embodiment, the vibration system 11 (that is, the movable plate 2, the supporting section 3, and the four link sections 4, 5, 6, and 7) is integrally formed by removing unnecessary parts of a SOI substrate by various etching methods such as dry etching and wet etching. Incidentally, a method for producing the vibration system 11 will be described later in detail.

The supporting section 3 has the function of supporting the movable plate 2. Such a supporting section 3 is shaped like a frame, and is provided so as to surround the movable plate 2. Incidentally, the shape of the supporting section 3 is not limited to a particular shape as long as the supporting section 3 can support the movable plate 2. For example, a pair of supporting sections 3 may be provided so that the supporting sections 3 face each other in the X-axis direction or the Y-axis direction with the movable plate 2 placed between the supporting sections 3.

Inside the supporting section 3, the movable plate 2 is provided. The movable plate 2 is shaped like a flat plate, and has a light reflecting section 22 formed on one surface (a surface facing away from the pedestal 12) 21 thereof. The light reflecting section 22 has light reflectivity. The light reflecting section 22 is obtained by forming, for example, a metal film such as gold, silver, or aluminum on the surface 21 by vapor deposition or the like.

Incidentally, in this embodiment, the planar shape of the movable plate 2 is a circle. However, the planar shape of the movable plate 2 is not limited to a particular shape, and may be, for example, a rectangle, a polygon such as a square, or an oval.

Such a movable plate 2 is connected to the supporting section 3 by the four link sections 4, 5, 6, and 7. The four link sections 4, 5, 6, and 7 are disposed at regular intervals, that is, at 90-degree intervals along a circumferential direction of the movable plate 2 in a plan view of the movable plate 2.

In addition, of the four link sections 4, 5, 6, and 7, the link sections 4 and 6 are formed so as to face each other in the X-axis direction with the movable plate 2 placed between them and to be symmetric with respect to the movable plate 2, and the link sections 5 and 7 are formed so as to face each other in the Y-axis direction with the movable plate 2 placed between them and to be symmetric with respect to the movable plate 2. By supporting the movable plate 2 by such link sections 4, 5, 6, and 7, it is possible to support the movable plate 2 in a stable state.

The four link sections 4, 5, 6, and 7 have a similar structure.

Specifically, the link section (a first link section) 4 has a drive section (a drive section) 41, a first shaft section 42 connecting the drive section 41 and the movable plate 2, and a pair of second shaft sections 43 connecting the drive section 41 and the supporting section 3. Moreover, the link section (a third link section) 5 also has a drive section 51, a first shaft section 52 connecting the drive section 51 and the movable plate 2, and a pair of second shaft sections 53 connecting the drive section 51 and the supporting section 3. Furthermore, the link section (a second link section) 6 also has a drive section 61, a first shaft section 62 connecting the drive section 61 and the movable plate 2, and a pair of second shaft sections 63 connecting the drive section 61 and the supporting section 3. In addition, the link section (a fourth link section) 7 also has a drive section 71, a first shaft section 72 connecting the drive section 71 and the movable plate 2, and a pair of second shaft sections 73 connecting the drive section 71 and the supporting section 3. Incidentally, the above-described "similar structure" means that the link sections are formed of common elements. Therefore, the outside shapes of the link sections do not have to be the same.

By structuring the link sections 4, 5, 6, and 7 in this way, the structures of the link sections are simplified, and, as will be described later, it is possible to perform turning or the like of the movable plate 2 about central turn axes X1 and Y1 smoothly.

Hereinafter, the link sections 4, 5, 6, and 7 will be described specifically. Since the link sections 4, 5, 6, and 7 have a similar structure, only the link section 4 will be described as a representative example, and the description of the other link sections 5, 6, and 7 will be omitted. Incidentally, the link sections 5 and 7 are disposed in a state in which the link sections 5 and 7 are shifted 90 degrees with respect to the link section 4 in a plan view of the movable plate 2. Therefore, the link sections 5 and 7 can be explained by replacing the "Y-axis direction" and the "X-axis direction" in the following description of the link section 4 with the "X-axis direction" and the "Y-axis direction", respectively.

As shown in FIG. 3, the pair of second shaft sections 43 is disposed so that the second shaft sections 43 face each other in the Y-axis direction with the drive section 41 placed between the second shaft sections 43, and supports the drive section 41 from both sides. Moreover, each of the pair of second shaft sections 43 is shaped like a bar extending in the Y-axis direction. Furthermore, the pair of second shaft sections 43 can be torsionally deformed (twisted) about the central axis. Such a pair of second shaft sections 43 is provided coaxially, and the pair of second shaft sections 43 is torsionally deformed about the axis (hereinafter also referred to as a "central turn axis Y2") and the drive section 41 turns about the axis.

The drive section 41 is spaced apart from the movable plate 2 in the X-axis direction. Moreover, as mentioned above, the drive section 41 is supported by being held by the pair of second shaft sections 43 from both sides. Such a drive section 41 has a through-hole 411 formed therein, and a permanent magnet 811 is passed through the through-hole and fixed therein. The permanent magnet 811 is fixed to the drive section 41 by being fitted (press-fitted) thereinto or with an adhesive, for example. Since the permanent magnet 811 is part of the structure of the displacement unit 8, the permanent magnet 811 will be described later.

Moreover, in this embodiment, the planar shape of the drive section 41 is a rectangle whose longitudinal direction is the Y-axis direction. By forming the drive section 41 into such a shape, it is possible to reduce the width of the drive section 41 (the extent thereof in the X-axis direction) while ensuring a space in which the permanent magnet 811 is fixed. By reducing the width of the drive section 41, it is possible to reduce the moment of inertia which is produced when the drive section 41 turns about the central turn axis Y2. This increases the reactivity of the drive section 41, and allows the drive section 41 to turn with higher speed. In addition, when the reactivity of the drive section 41 is increased, it is possible to prevent unnecessary vibration from being created by the turning of the drive section 41 (in particular, when the drive section 41 turns quickly and the turning direction changes). This makes it possible to drive the optical scanner 1 with stability.

Incidentally, the planar shape of the drive section 41 is not limited to a particular shape, and may be a square, a polygon with five or more sides, or a circle.

Such a drive section 41 is connected to the movable plate 2 by the first shaft section 42. The first shaft section 42 is provided as a whole so as to extend in the X-axis direction. Such a first shaft section 42 has a stress alleviating section 421 provided between the drive section 41 and the movable plate 2, a movable plate-side shaft section 422 connecting the stress alleviating section 421 and the movable plate 2, and a drive section-side shaft section (a drive section-side shaft section) 423 connecting the stress alleviating section 421 and the drive section 41.

The movable plate-side shaft section 422 and the drive section-side shaft section 423 are each shaped like a bar extending in the X-axis direction. Moreover, the movable plate-side shaft section 422 and the drive section-side shaft section 423 are provided coaxially.

Preferably, the hardness of the drive section-side shaft section 423 of the two shaft sections is set at a hardness with which great distortion does not occur when the optical scanner 1 is driven, and, more preferably, is set at a hardness with which virtually no distortion occurs. On the other hand, the movable plate-side shaft section 422 can be torsionally deformed about the central axis thereof. As described above, since the first shaft section 42 has a hard portion which is virtually undeformed and a torsionally deformable part located at the tip thereof, as will be described later, it is possible to turn the movable plate 2 about the X axis and the Y axis with stability. Incidentally, the portion "that is not deformed" described above refers to a portion in which bending or curving in the Z-axis direction and torsional deformation about the central axis virtually do not occur.

Such movable plate-side shaft section 422 and drive section-side shaft section 423 are connected to each other with the stress alleviating section 421 placed between the movable plate-side shaft section 422 and the drive section-side shaft section 423. The stress alleviating section 421 has the function of serving as a node when the first shaft section 42 bends and is deformed and the function of alleviating (absorbing) the torque produced by the torsional deformation of the movable plate-side shaft section 422 and thereby preventing or inhibiting the torque from being conveyed to the drive section-side shaft section 423.

As shown in FIG. 3, the stress alleviating section 421 has a pair of deformation sections 4211 and 4212, a nondeformed section 4213 provided between the deformation sections 4211 and 4212, a pair of connecting sections 4214 connecting the deformation section 4211 to the nondeformed section 4213, and a pair of connecting sections 4215 connecting the deformation section 4212 to the nondeformed section 4213.

The nondeformed section 4213 is shaped like a bar extending in the Y-axis direction. The hardness of such a nondeformed section 4213 is set at a hardness with which the nondeformed section 4213 is virtually not deformed when the optical scanner 1 is driven. As a result, as will be described later, it is possible to bend the first shaft section 42 at a central axis Y4 of the nondeformed section 4213. This makes it possible to allow the stress alleviating section 421 to reliably serve as a node and drive the optical scanner 1 with stability.

The pair of deformation sections 4211 and 4212 is disposed so as to be symmetric with respect to such a nondeformed section 4213. The deformation sections 4211 and 4212 are each shaped like a bar extending in the Y-axis direction. Moreover, the deformation sections 4211 and 4212 are arranged side by side so as to be spaced apart from each other in the X-axis direction. Such deformation sections 4211 and 4212 can be torsionally deformed about their respective central axes.

The deformation section 4211 located in a position closer to the movable plate 2 connects to one end of the movable plate-side shaft section 422 roughly in the center thereof in the longitudinal direction, and connects to the nondeformed section 4213 at both ends thereof via the pair of connecting sections 4214. Similarly, the deformation section 4212 located in a position closer to the drive section 41 connects to one end of the drive section-side shaft section 423 roughly in the center thereof in the longitudinal direction, and connects to the nondeformed section 4213 at both ends thereof via the pair of connecting sections 4215.

One of the pair of connecting sections 4214 connects the ends of the deformation section 4211 and the nondeformed section 4213, and the other connecting section connects the other ends of the deformation section 4211 and the nondeformed section 4213. Moreover, one of the pair of connecting sections 4215 connects the ends of the deformation section 4212 and the nondeformed section 4213, and the other connecting section connects the other ends of the deformation section 4212 and the nondeformed section 4213.

Such connecting sections 4214 and 4215 are each shaped like a bar extending in the X-axis direction. Moreover, the connecting sections 4214 and 4215 can bend in the Z-axis direction and can be torsionally deformed about their respective central axes.

This is the end of the specific description of the structure of the vibration system 11.

As mentioned earlier, the vibration system 11 structured as described above is integrally formed from a SOI substrate. This makes it easy to form the vibration system 11. Specifically, as mentioned earlier, the vibration system 11 has apart which is actively deformed and a part which is not deformed (a part in which deformation is undesirable). On the other hand, the SOI substrate is a substrate in which a first Si layer, a $SiO_2$ layer, and a second Si layer are laid one on top of another in this order. Thus, the part which is not deformed is formed of all the three layers described above and the part which is actively deformed is formed of only the second Si layer, in other words, the SOI substrate is made to have different thicknesses in the part which is not deformed and the part which is deformed. By doing so, it is possible to form the vibration system 11 with ease, the vibration system 11 having the part which is deformed and the part which is not deformed. Incidentally, the part which is actively deformed may be formed of two layers including the second Si layer and the $SiO_2$ layer.

The "part which is deformed" includes the second shaft sections 43, 53, 63, and 73, the movable plate-side shaft sections 422, 522, 622, and 722, the deformation sections 4211, 4212, 5211, 5212, 6211, 6212, 7211, and 7212, and the connecting sections 4214, 4215, 5214, 5215, 6214, 6215, 7214, and 7215.

On the other hand, the "part which is not deformed" includes the movable plate 2, the supporting section 3, the drive sections 41, 51, 61, and 71, the drive section-side shaft sections 423, 523, 623, and 723, and the nondeformed sections 4213, 5213, 6213, and 7213.

Hereinafter, based on FIGS. 4A to 4C and FIGS. 5A to 5C, an example of a method for producing the vibration system 11 will be described briefly. Incidentally, FIGS. 4A to 4C and FIGS. 5A to 5C are each a sectional view corresponding to a sectional view taken on the line A-A in FIG. 1. Moreover, the method for producing the vibration system 11 is not limited to this example.

First, as shown in FIG. 4A, a SOI substrate (a silicon substrate) 100 in which a first Si layer 110, a $SiO_2$ layer 120, a second Si layer 130 are laminated one on top of another in this order is prepared.

Next, as shown in FIG. 4B, $SiO_2$ films M1 and M2 are formed on both surfaces of the SOI substrate 100. Then, as shown in FIG. 4C, the $SiO_2$ film M2 is etched to obtain the planar shapes of the movable plate 2, the supporting section 3, and the link sections 4, 5, 6, and 7 by patterning, and the $SiO_2$ film M1 is etched to obtain the shapes corresponding to the movable plate 2, the supporting section 3, the drive sections 41, 51, 61, and 71, the drive section-side shaft sections 423, 523, 623, and 723, and the nondeformed sections 4213, 5213, 6213, and 7123 by patterning.

Then, as shown in FIG. 5A, the SOI substrate 100 is etched via the $SiO_2$ film M1. At this time, the $SiO_2$ layer 120 which is an intermediate layer of the SOI substrate 100 functions as a stop layer of the above etching. After the completion of the etching, the SOI substrate 100 is then etched via the $SiO_2$ film M2. Also at this time, the $SiO_2$ layer 120 which is the intermediate layer of the SOI substrate 100 functions as a stop layer of the above etching.

Incidentally, the etching method is not limited to a particular method, and, for example, one or two or more of a physical etching method such as plasma etching, reactive ion etching, beam etching, and photo-assisted etching and a chemical etching method such as wet etching can be used alone or in combination. It is to be noted that the similar method can be used in etching in each of the following processes.

Next, as shown in FIG. 5B, by removing the exposed portions of the $SiO_2$ films M1 and M2 and the $SiO_2$ layer 120 by etching by using BFH (buffered hydrofluoric acid) or the like, the outside shapes of the movable plate 2, the supporting section 3, and the link sections 4, 5, 6, and 7 are obtained.

Furthermore, as shown in FIG. 5C, a metal film is formed on the upper surface 21 of the movable plate 2, whereby the light reflecting section 22 is formed. The methods for forming the metal film (the light reflecting section 22) include a dry plating method such as vacuum vapor deposition, sputtering (low-temperature sputtering), and ion plating, a wet plating method such as electrolytic plating and nonelectrolytic plating, thermal spraying, bonding of metal foil, and the like.

In this way, the vibration system 11 is obtained.

1-2. Pedestal 12

As shown in FIG. 2, the pedestal 12 has a flat plate-shaped base 121 and a frame section 122 provided along the edge of the base 121, and is shaped like a box (a square measuring cup). Such a pedestal 12 is bonded to the lower surface of the supporting section 3 of the vibration system 11 by the frame section 122. As a result, the vibration system 11 is supported by the pedestal 12. A chief material of such a pedestal 12 is glass or silicon, for example. Incidentally, the method for bonding the pedestal 12 to the supporting section 3 is not limited to a particular method. The pedestal 12 may be bonded to the supporting section 3 by using an adhesive, for example, and various bonding methods such as anodic bonding may be used.

1-3. Displacement Unit 8

As shown in FIG. 1, the displacement unit 8 includes a first displacement unit 81 having a permanent magnet 811, a coil 812, and a power supply 813, a second displacement unit 82 having a permanent magnet 821, a coil 822, and a power supply 823, a third displacement unit 83 having a permanent magnet 831, a coil 832, and a power supply 833, and a fourth displacement unit 84 having a permanent magnet 841, a coil 842, and a power supply 843.

In addition, the first displacement unit 81 is provided for the link section 4, the second displacement unit 82 is provided for the link section 5, the third displacement unit 83 is provided for the link section 6, and the fourth displacement unit 84 is provided for the link section 7.

According to such a structure, the structure of the displacement unit 8 is simplified. Moreover, by electromagnetically driving the displacement unit 8, it is possible to produce a relatively large force and thereby turn the movable plate 2 more reliably. Furthermore, as a result of one displacement unit being provided for each of the link sections 4, 5, 6, and 7, it is possible to deform the link sections 4, 5, 6, and 7 independently. This makes it possible to displace the movable plate 2 in various ways as will be described later.

Hereinafter, the first displacement unit 81, the second displacement unit 82, the third displacement unit 83, and the fourth displacement unit 84 will be described. In the following description, since these displacement units have a similar structure, only the first displacement unit 81 will be described as a representative example, and the description of the second displacement unit 82, the third displacement unit 83, and the fourth displacement unit 84 will be omitted. Incidentally, the second displacement unit 82 and the fourth displacement unit 84 are disposed in a state in which the second displacement unit 82 and the fourth displacement unit 84 are shifted 90 degrees with respect to the first displacement unit 81 in a plan view of the movable plate 2. Therefore, the second displacement unit 82 and the fourth displacement unit 84 can be explained by replacing the "Y-axis direction" and the "X-axis direction" in the following description of the first displacement unit 81 with the "X-axis direction" and the "Y-axis direction", respectively.

As shown in FIG. 6, the permanent magnet 811 is shaped like a bar, and is magnetized in the longitudinal direction thereof. That is, the permanent magnet 811 has a south pole at one end thereof and a north pole at the other end thereof in the longitudinal direction. Such a permanent magnet 811 is placed through the through-hole 411 formed in the drive section 41, and is fixed to the drive section 41 roughly in the center thereof in the longitudinal direction. In addition, the permanent magnet 811 projects from upper and lower faces of the drive section 41 so that the lengths of the upper and lower projected portions are the same, and the south pole and the north pole face each other with the drive section 41 (the central turn axis Y2) between these poles. As a result, it is possible to displace the movable plate 2 with stability, as will be described later.

Moreover, the permanent magnet 811 is provided so that the longitudinal direction thereof is perpendicular to a planar direction of the drive section 41. Furthermore, the permanent magnet 811 is provided so that the central axis thereof intersects with the central turn axis Y2.

Such a permanent magnet 811 is not limited to a particular type, and a magnetized hard magnetic material such as a neodymium magnet, a ferrite magnet, a samarium-cobalt magnet, an alnico magnet, and a bonded magnet can be used suitably.

Incidentally, in this embodiment, the permanent magnet 811 is shaped like a bar; however, the shape of the permanent magnet is not limited to a particular shape. For example, the permanent magnet 811 may be shaped like a plate. In this case, the permanent magnet 811 is magnetized in a planar direction, and is fixed to the drive section 41 so that the planar direction is perpendicular to the X-axis direction. This makes it possible to shorten the length of the permanent magnet 811 in the X-axis direction and thereby reduce the moment of inertia which is produced by the turning of the drive section 41.

The coil 812 produces a magnetic field which acts on the permanent magnet 811. Such a coil 812 is disposed near the outside of the vibration system 11 so as to face the permanent magnet 811 in the X-axis direction. Moreover, the coil 812 is provided so that the coil 812 can produce a magnetic field in the X-axis direction, that is, the coil 812 can produce a state in which the side of the coil 812 which faces the permanent magnet 811 becomes a north pole and the side thereof facing away from the permanent magnet 811 becomes a south pole and a state in which the side of the coil 812 which faces the permanent magnet 811 becomes a south pole and the side thereof facing away from the permanent magnet 811 becomes a north pole.

The optical scanner 1 of this embodiment has a coil fixing section 85 which is provided outside the vibration system 11 and is fixed to the pedestal 12, and the coil 812 is wound around a projecting section 851 of the coil fixing section 85, the projecting section 851 extending in the X-axis direction. With such a structure, it is possible to fix the coil 812 to the vibration system 11 and produce the above-described magnetic field with ease. Moreover, by using a soft magnetic material such as iron to form the projecting section 851, it is possible to use the projecting section 851 as a magnetic core of the coil 812, and it is also possible to produce the above-described magnetic field more efficiently.

The power supply 813 is electrically connected to the coil 812. In addition, by applying an intended voltage to the coil 812 from the power supply 813, it is possible to produce the above-described magnetic field from the coil 812. In this embodiment, the power supply 813 can selectively apply an alternating voltage and a direct-current voltage. Moreover, when the alternating voltage is applied, the strength and frequency thereof can be changed, and an offset voltage (a direct-current voltage) can also be superimposed on the alternating voltage.

2. Operation of Optical Scanner 1

Next, the operation of the optical scanner will be described.

In the optical scanner 1 structured as described above, a pattern can be selected from a pattern in which the movable plate 2 is turned, a pattern in which the movable plate 2 is vibrated, and a pattern in which the movable plate 2 is made to come to rest in a predetermined position. As described above, the optical scanner 1 can be driven in various patterns, which is the effect obtained by bending and deforming the first shaft sections 42, 52, 62, and 72 of the link sections 4, 5, 6, and 7 as will be described later.

Hereinafter, these three patterns will be described sequentially. Incidentally, in the following description, for convenience of explanation, a structure in which the permanent magnets 811, 821, 831, and 841 are disposed with the north poles placed in an upper position will be described as a representative example.

2-1. Turning

Turning about the Y Axis

Turning of the movable plate 2 about the Y axis will be described based on FIGS. 7A and 7B. Incidentally, FIGS. 7A and 7B are each a sectional view corresponding to a sectional view taken on the line A-A in FIG. 1.

First, the alternating voltages are applied to the coils 812 and 832 from the power supplies 813 and 833 so that a state changes between a first state in which the side of the coil 812 which faces the permanent magnet 811 becomes a north pole and the side of the coil 832 which faces the permanent magnet 831 becomes a south pole and a second state in which the side of the coil 812 which faces the permanent magnet 811 becomes a south pole and the side of the coil 832 which faces the permanent magnet 831 becomes a north pole alternately and periodically. It is preferable that the alternating voltages applied to the coils 812 and 832 from the power supplies 813 and 833 have the same waveform (the same strength and frequency).

In the first state shown in FIG. 7A, since the south pole of the permanent magnet 811 is attracted to the coil 812 and the north pole moves away from the coil 812, the drive section 41 tilts about the central turn axis Y2 so as to direct the upper surface thereof toward the movable plate 2 while torsionally deforming the pair of second shaft sections 43. With this, since the north pole of the permanent magnet 831 is attracted to the coil 832 and the south pole moves away from the coil 832, the drive section 61 tilts about the central turn axis Y3 so as to direct the lower surface thereof toward the movable plate 2 while torsionally deforming the pair of second shaft sections 63. That is, both the drive sections 41 and 61 tilt in a clockwise direction in FIG. 7A.

With the tilt of the drive sections 41 and 61, the drive section-side shaft section 423 tilts so that the end thereof which is closer to the movable plate 2 faces downward, and the drive section-side shaft section 623 tilts so that the end thereof which is closer to the movable plate 2 faces upward. As a result, the ends of the drive section-side shaft sections 423 and 623 which are closer to the movable plate 2 are moved off center in the Z-axis direction.

Then, as a result of the ends of the drive section-side shaft sections 423 and 623 which are closer to the movable plate 2 being moved off center in the Z-axis direction, the movable plate-side shaft sections 422 and 622 and the movable plate 2 integrally tilt in a counterclockwise direction in FIG. 7A while torsionally deforming the deformation sections 4211, 4212, 6211, and 6212 about the central axes thereof and curving and deforming the connecting sections 4214, 4215, 6214, and 6215.

As described above, in the first state, as a result of the first shaft section 42 of the link section 4 bending and being deformed into the shape of a letter V projecting downward at the stress alleviating section 421 provided at the midpoint thereof (first deformation) and the first shaft section 62 of the link section 6 bending and being deformed into the shape of a letter V projecting upward at the stress alleviating section 621 provided at the midpoint thereof (second deformation), the movable plate 2 tilts about the central turn axis Y1 in a counterclockwise direction in FIG. 7A.

On the other hand, in the second state shown in FIG. 7B, a deformation opposite to the first state described above occurs. That is, in the second state, as a result of the first shaft section 42 of the link section 4 bending and being deformed into the shape of a letter V projecting upward at the stress alleviating section 421 (second deformation) and the first shaft section 62 of the link section 6 bending and being deformed into the shape of a letter V projecting downward at the stress alleviating section 621 (first deformation), the movable plate 2 tilts about the central turn axis Y1 in the counterclockwise direction in FIG. 7B.

By changing a state between the above-described first state and the above-described second state alternately and periodically, it is possible to turn the movable plate 2 about the central turn axis Y1. Incidentally, the turning of the movable plate 2 about the central turn axis Y1 is allowed as a result of the movable plate-side shaft sections 522 and 722 of the link sections 5 and 7 being torsionally deformed about the central axes thereof.

Incidentally, the frequencies of the alternating voltages applied to the coils 812 and 832 are not limited to a particular frequency, and may be equal to or different from the resonance frequency of the vibration system formed of the movable plate 2 and the link sections 4, 5, 6, and 7. However, it is preferable that the frequencies of the alternating voltages be different from the resonance frequency. That is, it is preferable to drive the optical scanner 1 in a nonresonant manner. This makes it possible to drive the optical scanner 1 more stably.

Turning about the X Axis

Next, turning of the movable plate 2 about the X axis will be described based on FIGS. 8A and 8B. Incidentally, FIGS. 8A and 8B are each a sectional view corresponding to a sectional view taken on the line B-B in FIG. 1.

First, the alternating voltages are applied to the coils 822 and 842 from the power supplies 823 and 843 so that a state changes between a first state in which the side of the coil 822 which faces the permanent magnet 821 becomes a north pole and the side of the coil 842 which faces the permanent magnet 841 becomes a south pole and a second state in which the side of the coil 822 which faces the permanent magnet 821 becomes a south pole and the side of the coil 842 which faces the permanent magnet 841 becomes a north pole alternately and periodically. It is preferable that the alternating voltages applied to the coils 822 and 842 from the power supplies 823 and 843 have the same waveform.

As is the case with the above-described turning of the movable plate 2 about the central turn axis Y1, in the first state shown in FIG. 8A, as a result of the first shaft section 52 of the link section 5 bending and being deformed into the shape of a letter V projecting downward at the stress alleviating section 521 provided at the midpoint thereof (first deformation) and the first shaft section 72 of the link section 7 bending and being deformed into the shape of a letter V projecting upward at the stress alleviating section 721 provided at the midpoint thereof (second deformation), the movable plate 2 tilts about the central turn axis X1 in a counterclockwise direction in FIG. 8A.

On the other hand, in the second state shown in FIG. 8B, a deformation opposite to the first state described above occurs. That is, in the second state, as a result of the first shaft section 52 of the link section 5 bending and being deformed into the shape of a letter V projecting upward at the stress alleviating section 521 (second deformation) and the first shaft section 72 of the link section 7 bending and being deformed into the shape of a letter V projecting downward at the stress alleviating section 721 (first deformation), the movable plate 2 tilts about the central turn axis X1 in the counterclockwise direction in FIG. 8B.

By changing a state between the above-described first state and the above-described second state alternately and periodically, it is possible to turn the movable plate 2 about the central turn axis X1. Incidentally, the turning of the movable plate 2 about the central turn axis X1 is allowed as a result of the movable plate-side shaft sections 422 and 622 of the link sections 4 and 6 being torsionally deformed about the central axes thereof.

Incidentally, the frequencies of the alternating voltages applied to the coils 822 and 842 are not limited to a particular frequency, and may be equal to or different from the resonance frequency of the vibration system formed of the movable plate 2 and the link sections 4, 5, 6, and 7. However, it is preferable that the frequencies of the alternating voltages be different from the resonance frequency. That is, it is preferable to drive the optical scanner 1 in a nonresonant manner. This makes it possible to drive the optical scanner 1 more stably.

Turning about the X Axis and the Y Axis

By performing the above-described turning about the X axis and the above-described turning about the Y axis concurrently, it is possible to turn the movable plate 2 about the central turn axis Y1 and the central turn axis X1 two-dimensionally. As mentioned earlier, the turning of the movable plate 2 about the central turn axis Y1 is allowed as a result of the movable plate-side shaft sections 522 and 722 being torsionally deformed about the central axes thereof, and the turning of the movable plate 2 about the central turn axis X1 is allowed as a result of the movable plate-side shaft sections 422 and 622 being torsionally deformed about the central axes thereof.

In the above-described turning about the X axis, the Y axis, and these two axes, the frequencies of the alternating voltages applied to the coils 812, 822, 832, and 842 are not limited to a particular frequency, and may be equal to or different from the resonance frequency of the vibration system formed of the movable plate 2 and the link sections 4, 5, 6, and 7. However, it is preferable that the frequencies of the alternating voltages be different from the resonance frequency. That is, it is preferable to drive the optical scanner 1 in a nonresonant manner. This makes it possible to drive the optical scanner 1 more stably.

Moreover, the frequencies of the alternating voltages applied to the coils 812 and 832 for turning the movable plate 2 about the central turn axis Y1 and the frequencies of the alternating voltages applied to the coils 822 and 842 for turning the movable plate 2 about the central turn axis X1 may be equal to each other or different from each other. For example, when turning the movable plate 2 about the central turn axis Y1 faster than the turning about the central turn axis X1 is desired, it is necessary simply to set the frequencies of the alternating voltages applied to the coils 812 and 832 at a frequency higher than the frequencies of the alternating voltages applied to the coils 822 and 842.

Moreover, the strength of the alternating voltages applied to the coils 812 and 832 and the strength of the alternating voltages applied to the coils 822 and 842 may be equal to each other or different from each other. For example, when turning the movable plate 2 about the central turn axis Y1 in a larger way than the turning about the central turn axis X1 is desired, it is necessary simply to make the alternating voltages applied to the coils 812 and 832 stronger than the alternating voltages applied to the coils 822 and 842.

In the above description, the driving method by which the alternating voltages are applied to the coils 812, 822, 832, and 842 has been described. The movable plate 2 can also be turned by the following driving method. That is, a (+) or (−) offset voltage (a direct-current voltage) may be superimposed on the alternating voltages applied to the coils 812, 822, 832, and 842 from the power supplies 813, 823, 833, and 843. In other words, the force by which the north poles of the permanent magnets 811, 821, 831, and 841 are attracted to the coils 812, 822, 832, and 842 (hereinafter referred to simply as the "north pole attraction force") may be different from the force by which the south poles of the permanent magnets 811, 821, 831, and 841 are attracted to the coils 812, 822, 832, and 842 (hereinafter referred to simply as the "south pole attraction force").

Hereinafter, specific descriptions will be given. In the descriptions, the above-described state in which the north pole attraction force and the south pole attraction force are the same will be referred to as a "normal state".

Figure 9:
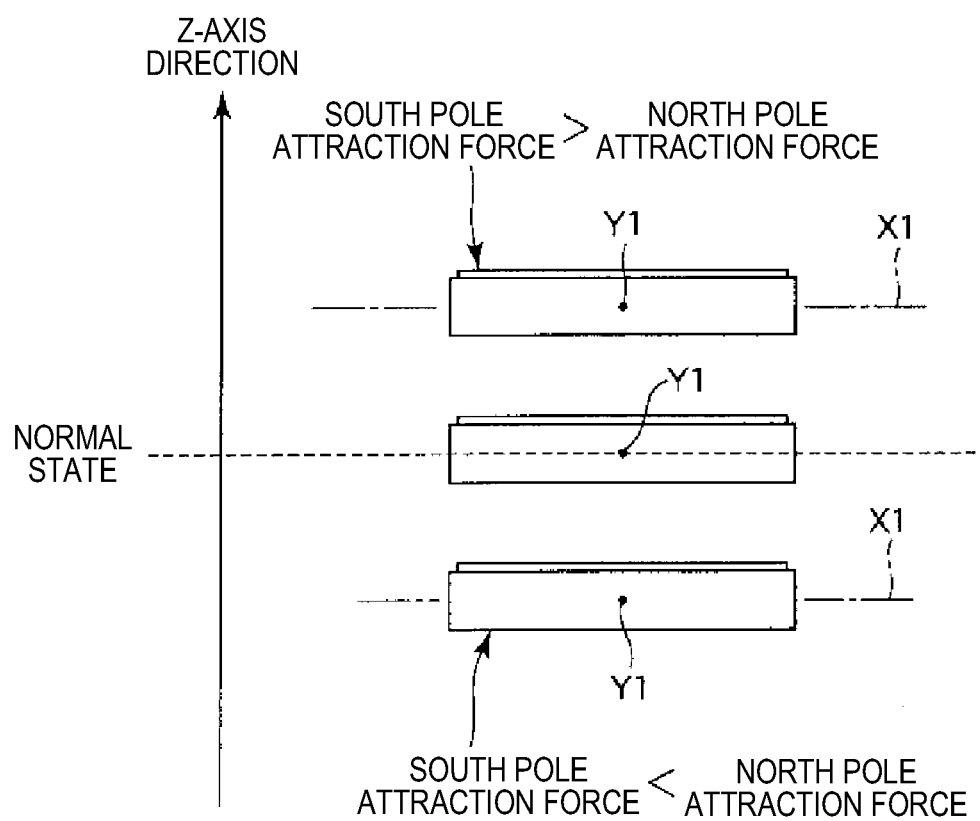
FIG. 9 is a diagram of the driving of the optical scanner shown in FIG. 1.

When the south pole attraction force of the coils 812, 822, 832, and 842 is stronger than the north pole attraction force, the upper dead center and the lower dead center (the points at which the turning direction changes) of the turning of the drive sections 41, 51, 61, and 71 are moved upward as compared to the normal state. As a result, as shown in FIG. 9, the central turn axes X1 and Y1 of the movable plate 2 are moved upward as compared to the normal state. Conversely, when the south pole attraction force of the coils 812, 822, 832, and 842 is weaker than the north pole attraction force, the upper dead center and the lower dead center of the turning of the drive sections 41, 51, 61, and 71 are moved downward as compared to the normal state. As a result, the central turn axes X1 and Y1 of the movable plate 2 are moved downward as compared to the normal state.

As described above, by superimposing the offset voltage on the alternating voltages applied to the coils 812, 822, 832, and 842 from the power supplies 813, 823, 833, and 843, it is possible to displace the central turn axes X1 and Y1 of the movable plate 2 in the Z-axis direction. As a result, when, for example, the optical scanner 1 is incorporated into an image forming apparatus such as a projector, it is possible to adjust the optical length of the light emitted from a light source, the optical length to the movable plate 2, even after the image forming apparatus is assembled. That is, although the positioning of the light source and the movable plate 2 is performed precisely at the time of assembly of the image forming apparatus, even if the positions of these components become different from the set values, it is possible to correct the positions of the light source and the movable plate 2 after assembly.

2-2. Vibration

First, the alternating voltages are applied to the coils 812, 822, 832, and 842 from the power supplies 813, 823, 833, and 843 so that a state changes between a first state in which the sides of the coils 812, 822, 832, and 842 which face the permanent magnets 811, 821, 831, and 841 become north poles and a second state in which the sides of the coils 812, 822, 832, and 842 which face the permanent magnets 811, 821, 831, and 841 become south poles alternately and periodically. It is preferable that the alternating voltages applied to the coils 812, 822, 832, and 842 from the power supplies 813, 823, 833, and 843 have the same waveform.

In the first state shown in FIG. 10A, in the same manner as in the above-described turning, the drive sections 41, 51, 61, and 71 tilt about the central turn axes Y2, X2, Y3, and X3 so as to direct the upper surfaces thereof toward the movable plate 2. As a result of the drive sections 41, 51, 61, and 71 tilting in the manner described above, the drive section-side shaft sections 423, 523, 623, and 723 tilt so that the ends thereof which are closer to the movable plate 2 face downward. As a result, the movable plate-side shaft sections 422, 522, 622, and 722 and the movable plate 2 integrally move downward with the position (that is, the planar direction) of the movable plate 2 kept constant while at the same time the first shaft sections 42, 52, 62, and 72 bend at the stress alleviating sections 421, 521, 621, and 721.

On the other hand, in the second state shown in FIG. 10B, the drive sections 41, 51, 61, and 71 tilt about the central turn axes Y2, X2, Y3, and X3 so as to direct the lower surfaces thereof toward the movable plate 2. As a result of the drive sections 41, 51, 61, and 71 tilting in the manner described above, the drive section-side shaft sections 423, 523, 623, and 723 tilt so that the ends thereof which are closer to the movable plate face upward. As a result, the movable plate-side shaft sections 422, 522, 622, and 722 and the movable plate 2 integrally move upward with the position of the movable plate 2 kept constant while at the same time the first shaft sections 42, 52, 62, and 72 bend at the stress alleviating sections 421, 521, 621, and 721.

By changing a state between the above-described first state and the above-described second state alternately, it is possible to vibrate the movable plate 2 in the Z-axis direction while keeping the position thereof, that is, keeping the front surface of the light reflecting section 22 parallel to the X-Y plane.

Incidentally, the frequencies of the alternating voltages applied to the coils 812, 822, 832, and 842 are not limited to a particular frequency, and may be equal to or different from the resonance frequency of the vibration system formed of the movable plate 2 and the link sections 4, 5, 6, and 7. However, it is preferable that the frequencies of the alternating voltages be equal to the resonance frequency. That is, it is preferable to drive the optical scanner 1 in a resonant manner. This makes it possible to drive the optical scanner 1 more stably.

Also in such a vibration pattern, as is the case with the turning pattern described above, by superimposing the offset voltage on the alternating voltages applied to the coils 812, 822, 832, and 842, it is possible to vibrate the movable plate 2 by shifting the movable plate 2 in the Z-axis direction from the natural state.

2-3. Static Pattern

For example, the direct-current voltages are applied to the coils 812, 822, 832, and 842 from the power supplies 813, 823, 833, and 843 so that the sides of the coils 812, 822, 832, and 842 which face the permanent magnets 811, 821, 831, and 841 become north poles. It is preferable that the direct-current voltages applied to the coils 812, 822, 832, and 842 from the power supplies 813, 823, 833, and 843 have the same strength. When such voltages are applied to the coils 812, 822, 832, and 842, the movable plate 2 comes to rest in a state shown in FIG. 10A.

On the other hand, when the direct-current voltages are applied to the coils 812, 822, 832, and 842 from the power supplies 813, 823, 833, and 843 so that the sides of the coils 812, 822, 832, and 842 which face the permanent magnets 811, 821, 831, and 841 become south poles, the movable plate 2 comes to rest in a state shown in FIG. 10B.

As described above, it is possible to keep the movable plate 2 at a position which is different from the position in the natural state. According to such driving, for example, since it is possible to displace the optical path of the light reflected by the light reflecting section 22 from the position in the natural state, such driving is particularly effective when the optical scanner 1 is used as an optical switch, for example.

Moreover, for example, when the optical scanner 1 is incorporated into an image forming apparatus such as a projector, by moving the movable plate 2 to a position which is different from the position in the natural state (a position which does not intersect with the optical path of the laser) if there is a need to stop emission of the laser toward the outside of the apparatus due to, for example, abnormal laser emitted from the light source, the reflection of the laser by the light reflecting section 22 is prevented. This makes it possible to prevent the laser from being emitted to the outside of the apparatus. Moreover, emission of the laser to the outside of the apparatus may be prevented by changing the optical path of the laser reflected by the light reflecting section 22 by displacing the movable plate 2. This eliminates the need to incorporate an extra safety mechanism for solving such a problem, and simplifies the production process of the image forming apparatus, whereby it is possible to reduce production costs.

The movable plate 2 can also be maintained in a state in which the movable plate 2 is tilted as compared to the natural state by applying such static driving of the movable plate 2 and making the strengths of the direct-current voltages applied to the coils 812, 822, 832, and 842 different from one another. Moreover, by independently changing the strengths of the direct-current voltages applied to the coils 812, 822, 832, and 842 with time, it is also possible to displace the movable plate 2 continuously or irregularly in stages. Such a driving method is particularly effective in performing vector scanning on the light reflected by the light reflecting section 22, for example.

This is the end of the detailed description of the driving of the optical scanner 1.

In such an optical scanner 1, it is possible to perform the turning of the movable plate 2 about the central turn axis Y1 and the turning of the movable plate 2 about the central turn axis X1 by the same mechanism. Moreover, in the optical scanner 1, it is possible to perform the turning of the movable plate 2 about the central turn axis Y1 and the turning of the movable plate 2 about the central turn axis X1 independently. That is, in the optical scanner 1, the turning about the central turn axis Y1 is unaffected by the turning about the central turn axis X1, and the turning about the central turn axis X1 is unaffected by the turning about the central turn axis Y1. Therefore, according to the optical scanner 1, it is possible to turn the movable plate 2 about the central turn axis Y1 and the central turn axis X1 with stability.

Moreover, as mentioned earlier, in the optical scanner 1, the turning of the movable plate 2 about the central turn axis Y1 is allowed as a result of the movable plate-side shaft sections 522 and 722 being torsionally deformed about the central axes thereof, and the turning of the movable plate 2 about the central turn axis X1 is allowed as a result of the movable plate-side shaft sections 422 and 622 being torsionally deformed about the central axes thereof. As described above, since the link sections 4, 5, 6, and 7 have the movable plate-side shaft sections 422, 522, 622, and 722 which can be torsionally deformed about the central axes, it is possible to turn the movable plate 2 about the central turn axes Y1 and X1 smoothly.

Furthermore, in the optical scanner 1, since the movable plate-side shaft sections 422, 522, 622, and 722 are directly connected to the movable plate 2, it is possible to turn the movable plate 2 about the central turn axes Y1 and X1 and vibrate the movable plate 2 in the Z-axis direction more smoothly.

In addition, in the optical scanner 1, as mentioned earlier, in the link section 4, the stress alleviating section 421 is provided between the movable plate-side shaft section 422 which is torsionally deformed and the drive section-side shaft section 423 in which deformation is undesirable. Therefore, the stress produced by the above-mentioned torsional deformation is absorbed and alleviated by the deformation of the deformation sections 4211 and 4212 and the connecting sections 4214 and 4215 of the stress alleviating section 421, and is not conveyed to the drive section-side shaft section 423. That is, by providing the stress alleviating section 421, it is possible to prevent the drive section-side shaft section 423 from being torsionally deformed about the central axis thereof during the turning of the movable plate 2 with reliability. The same goes for the other link sections 5, 6, and 7. As a result, it is possible to turn the movable plate 2 about the central turn axes Y1 and X1 smoothly.

Furthermore, the breakdown of the drive section-side shaft sections 423, 523, 623, and 723 is effectively prevented. That is, it has been technically proven that, in a bar-shaped member, the breakdown strength thereof when the stress in the Z-axis direction is applied from the state in which a torsional deformation about the central axis occurs is lower than the breakdown strength thereof when the stress in the Z-axis direction is applied from the natural state. Thus, as described above, by providing the stress alleviating sections 421, 521, 621, and 721 and preventing the drive section-side shaft sections 423, 523, 623, and 723 from being torsionally deformed, it is possible to prevent the breakdown of the drive section-side shaft sections 423, 523, 623, and 723 effectively.

Moreover, since the drive section-side shaft section 423 is virtually undeformed in the link section 4, it is possible to use the stress produced by the turning of the drive section 41 for the turning of the movable plate 2 efficiently. The same goes for the link sections 5, 6, and 7. Therefore, it is possible to turn the movable plate 2 at a great turning angle with lower power and vibrate the movable plate 2 with a great amplitude in the Z-axis direction.

Furthermore, since the stress alleviating section 421 has the nondeformed section 4213 in the link section 4, it is possible to bend the first shaft section 42 at the nondeformed section 4213. The same goes for the link sections 5, 6, and 7. Therefore, it is possible to bend the first shaft sections 42, 52, 62, and 72 of the link sections 4, 5, 6, and 7 with ease and reliability, and turn and vibrate the movable plate 2 with stability.

In addition, in the link section 4, the stress alleviating section 421 has the deformation section 4211 connected to the movable plate-side shaft section 422 and the deformation section 4212 connected to the drive section-side shaft section 423, and the deformation sections 4211 and 4212 are torsionally deformed about the central axes when the first shaft section 42 bends, whereby the stress produced by the bending is effectively alleviated. The same goes for the link sections 5, 6, and 7. Therefore, it is possible to bend the first shaft sections 42, 52, 62, and 72 of the link sections 4, 5, 6, and 7 with reliability and prevent the breakdown of the first shaft sections 42, 52, 62, and 72. That is, it is possible to drive the optical scanner 1 with stability.

Moreover, since the stress alleviating section 421 has the pair of deformation sections 4211 and 4212 in the link section 4, it is also possible to obtain the following effect. That is, the deformation of the deformation sections 4211 and 4212 make it possible to allow the thermal expansion of the movable plate-side shaft section 422 and the drive section-side shaft section 423 caused by, for example, the heat generated from the coil 812 by energization and the heat generated by the light shone onto the light reflecting section 22. The same goes for the link sections 5, 6, and 7. Therefore, the optical scanner 1 can prevent or inhibit the stress from remaining in the vibration system 11, and thereby realizes intended vibration characteristics irrespective of the temperature.

Here, the structure of the optical scanner 1 is described again. Regarding the link sections 4 and 6, when the distance between the central turn axis Y1 and the central axis Y4 of the nondeformed section 4213 and the distance between the central turn axis Y1 and the central axis Y5 of the nondeformed section 6213 are L1, and the distance between the central axis Y5 and the central turn axis Y2 and the distance between the central axis Y5 and the central turn axis Y3 are L2, the magnitude relation between L1 and L2 is not limited to a particular relation; the relation may satisfy L1>L2, L1=L2, or L1<L2.

When L1=L2, the movable plate-side shaft section 422 and the drive section-side shaft section 423 are equal in tilt with respect to the X axis when the movable plate 2 is turned about the central turn axis Y1, that is, when the first shaft section 42 bends. As a result, in this case, almost the same torque is applied to the pair of deformation sections 4211 and 4212 of the stress alleviating section 421. Moreover, the turning angle of the drive section 41 and the turning angle of the movable plate 2 become almost equal. The same goes for the first shaft section 62 of the link section 6. Therefore, it is possible to bend the first shaft sections 42 and 62 more efficiently. In addition, the turning angle of the movable plate 2 is easy to control, making it possible, for example, to turn the movable plate 2 about the central turn axis Y1 with stability.

Furthermore, when L1=L2, as described above, since almost the same torque is applied to the deformation sections 4211 and 4212, it is preferable that the deformation sections 4211 and 4212 be formed so as to have the same shape and show the same physical characteristics (ease of torsional deformation). This makes it possible to prevent excessive torsion or insufficient torsion in any one of the deformation sections 4211 and 4212, making it possible to bend the first shaft section 42 smoothly. The same goes for the link section 6.

When L1>L2, although the turning angle of the movable plate 2 is smaller than the turning angle thereof when L1=L2, it is possible to control the position of the movable plate 2 with a higher degree of precision. That is, in this case, the tilt of the movable plate-side shaft section 422 with respect to the X axis when the first shaft section 42 bends becomes smaller than the tilt of the drive section-side shaft section 423. The same goes for the link section 6. Therefore, the turning angle of the movable plate 2 becomes smaller than the turning angle of the drive sections 41 and 61. This makes it possible to control the turning angle of the movable plate 2 and the tilt of the movable plate 2 during rest with a high degree of precision.

Moreover, when L1>L2, as mentioned earlier, since the tilt of the drive section-side shaft section 423 with respect to the X axis when the first shaft section 42 bends becomes greater than the tilt of the movable plate-side shaft section 422, the torque applied to the deformation section 4212 becomes greater than the torque applied to the deformation section 4211. Therefore, in this case, it is preferable that the deformation section 4212 be formed so as to be torsionally deformed more easily than the deformation section 4211. Specifically, it is preferable that, for example, the width of the deformation section 4212 be smaller than the width of the deformation section 4211. The reason is as follows. As mentioned earlier, since the link section 4 is formed by etching the SOI substrate 100 in the thickness direction thereof, control of the width coincident with the planar direction of the SOI substrate 100 can be performed easily and without an increase in the number of processes. The same goes for the link section 6.

When L1<L2, it is possible to make the turning angle of the movable plate 2 greater than the turning angle thereof when L1=L2. That is, in this case, the tilt of the movable plate-side shaft section 422 with respect to the X axis when the first shaft section 42 bends becomes greater than the tilt of the drive section-side shaft section 423. The same goes for the link section 6. Therefore, the turning angle of the movable plate 2 becomes greater than the turning angle of the drive sections 41 and 61. This makes it possible to increase the turning angle of the movable plate 2 and the tilt of the movable plate 2 during rest.

Moreover, when L1<L2, contrary to when L1>L2, it is preferable that the deformation section 4211 be formed so as to be torsionally deformed more easily than the deformation section 4212. The same goes for the link section 6.

Although the link sections 4 and 6 have been described above, the same goes for the link sections 5 and 7. That is, when the distance between the central turn axis X1 and the central axis X4 of the nondeformed section 5213 and the distance between the central turn axis X1 and the central axis X5 of the nondeformed section 7213 are L3, and the distance between the central axis X4 and the central turn axis X2 and the distance between the central axis X5 and the central turn axis X3 are L4, the magnitude relation between L3 and L4 is not limited to a particular relation; the relation may satisfy L3>L4, L3=L4, or L3<L4. Incidentally, the effects obtained when L3>L4, L3=L4, and L3<L4 are the same as the above-described effects obtained when L1>L2, L1=L2, and L1<L2, respectively, and therefore the descriptions thereof are omitted.

The relation between L1 and L2 and the relation between L3 and L4 may or may not be coincident with each other. That is, for example, L1=L2 and L3=L4, L1>L2 and L3>L4, or L1<L2 and L3<L4 may hold, or L1=L2 and L3>L4, L1>L2 and L3=L4, or L1>L2 and L3<L4 may hold. Moreover, L1 and L3 may be equal to each other or may be different from each other, and L2 and L4 may be equal to each other or may be different from each other.

As described above, in the optical scanner 1, by changing the length and relation of the L1, L2, L3, and L4, it is possible to obtain different effects. Therefore, the optical scanner 1 is highly convenient. Incidentally, the length and relation of L1, L2, L3, and L4 may be appropriately set based on the use (desired characteristics) of the optical scanner 1.

Second Embodiment

Next, a second embodiment of the optical scanner of the invention will be described.

Figure 11:
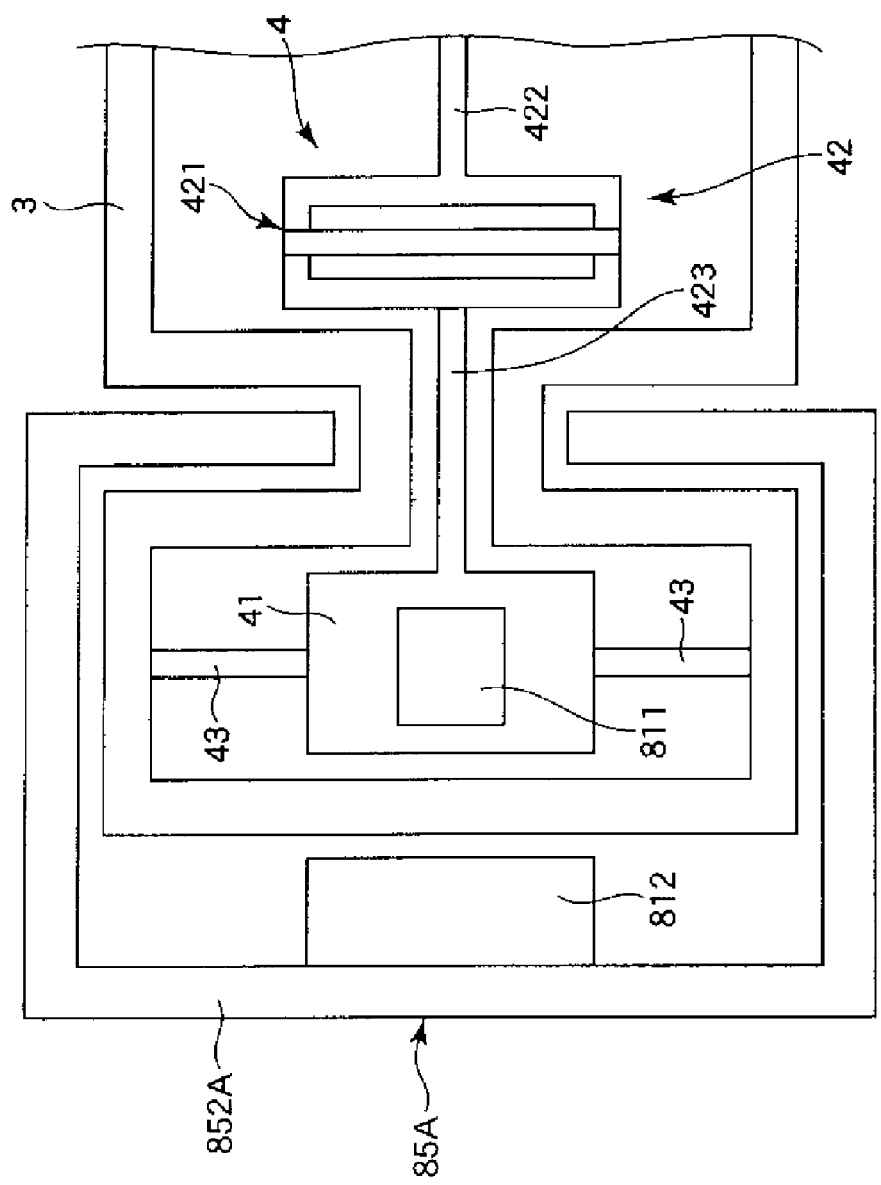
FIG. 11 is a plan view showing a second embodiment of the optical scanner of the invention.

FIG. 11 is a plan view showing the second embodiment of the optical scanner of the invention.

Hereinafter, regarding the optical scanner of the second embodiment, only differences from the optical scanner of the embodiment described above are explained, and the explanations of such matters as are found also in the embodiment described above will be omitted.

The optical scanner of the second embodiment is almost the same as the optical scanner 1 of the first embodiment except for the structure of the coil fixing section. It is to be noted that such components as are found also in the first embodiment described above will be identified with the same reference characters.

In the optical scanner 1 of this embodiment, a coil fixing section 85A has a main body section 852A formed so as to surround the coil 812 and the permanent magnet 811 (by removing a portion corresponding to the first shaft section 42). Such a main body section 852A prevents or inhibits the magnetic force produced from the coil 812 from leaking to the outside of the coil fixing section 85A while acting on the permanent magnet 811. That is, the main body section 852A has magnetic shielding capability. As a result, for example, it is possible to prevent the magnetic field produced from the coil 812 from acting on the permanent magnets 821, 831, and 841 located on the opposite side and drive the optical scanner 1 with stability.

The structure of the main body section 852A is not limited to a particular structure as long as the above-described effect can be obtained. For example, the main body section 852A may be formed of a material having magnetic shielding capability, or may have a front surface to which magnetic shielding paint is applied.

Incidentally, unillustrated coil fixing sections fixing the coils 822, 832, and 842 have a structure similar to that of the coil fixing section 85A.

According to such a second embodiment, it is possible to obtain the same effects as those of the first embodiment.

Third Embodiment

Next, a third embodiment of the optical scanner of the invention will be described.

Figure 12:
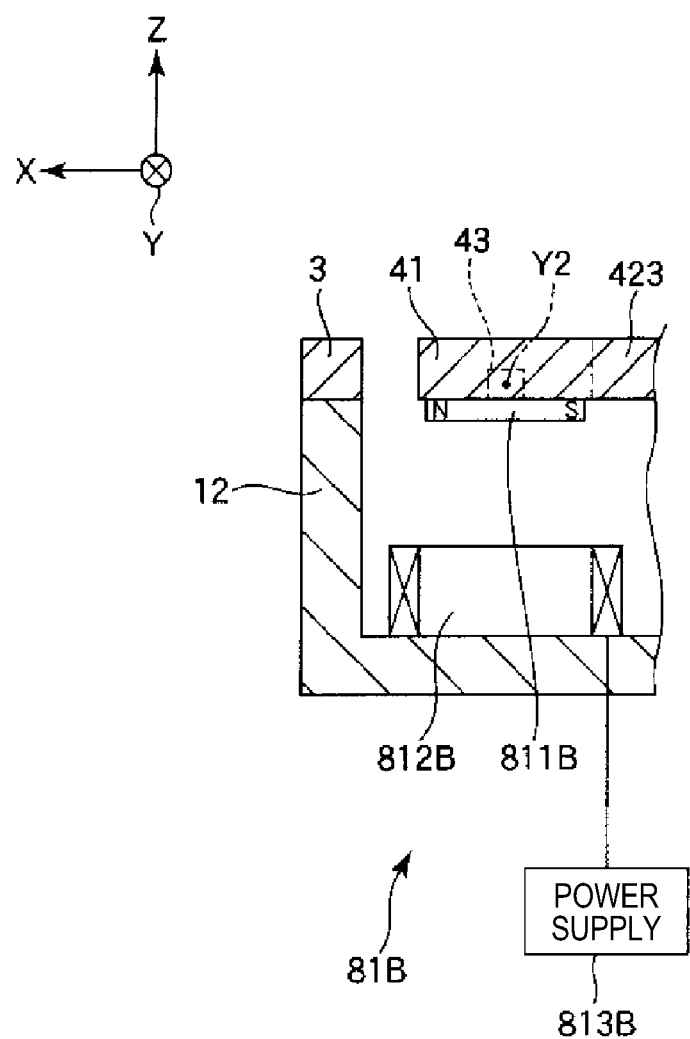
FIG. 12 is a sectional view showing a third embodiment of the optical scanner of the invention.

FIG. 12 is a sectional view showing the third embodiment of the optical scanner of the invention.

Hereinafter, regarding the optical scanner of the third embodiment, only differences from the optical scanners of the embodiments described above are explained, and the explanations of such matters as are found also in the embodiments described above will be omitted.

The optical scanner of the third embodiment is almost the same as the optical scanners described above except for the structure of the displacement unit. Incidentally, in this embodiment, since a first displacement unit, a second displacement unit, a third displacement unit, and a fourth displacement unit of the displacement unit have a similar structure, only the first displacement unit will be described as a representative example, and the description of the second displacement unit, the third displacement unit, and the fourth displacement unit will be omitted. Moreover, such components as are found also in the first embodiment described earlier will be identified with the same reference characters.

As shown in FIG. 12, a first displacement unit 81B has a permanent magnet 811B, a coil 812B, and a power supply 813B. The permanent magnet 811B is shaped like a flat plate, and is fixed to the lower surface (a surface facing the pedestal 12) of the drive section 41. Moreover, the permanent magnet 811B is provided so that the south pole and the north pole face each other with respect to the central turn axis Y2 with the permanent magnet 811B fixed to the drive section 41.

The coil 812B is provided below the permanent magnet 811B. The coil 812B can produce a magnetic field in the X-axis direction when a voltage is applied thereto from the power supply 813B. By attracting one of the south pole and the north pole of the permanent magnet 811B to the coil 812B and moving the other magnet away from the coil 812B by the action of the magnetic field produced from the coil 812B, it is possible to tilt the drive section 41 about the central turn axis Y2.

According to such a third embodiment, it is possible to obtain the same effects as those of the first embodiment.

Fourth Embodiment

Next, a fourth embodiment of the optical scanner of the invention will be described.

Figure 13:
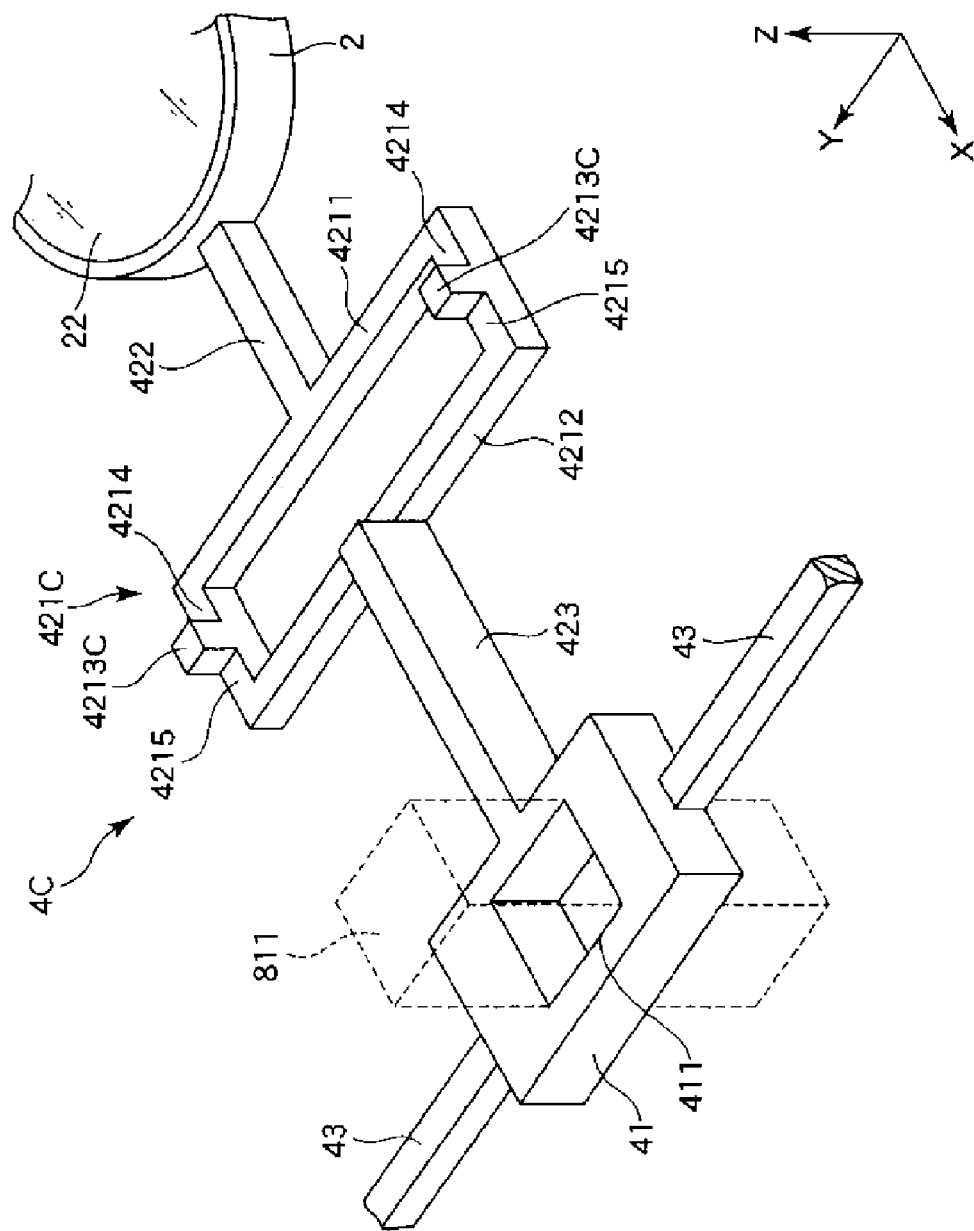
FIG. 13 is a perspective view showing a fourth embodiment of the optical scanner of the invention.

FIG. 13 is a perspective view showing the fourth embodiment of the optical scanner of the invention.

Hereinafter, regarding the optical scanner of the fourth embodiment, only differences from the optical scanners of the embodiments described above are explained, and the explanations of such matters as are found also in the embodiments described above will be omitted.

The optical scanner of the fourth embodiment is almost the same as the optical scanners described above except for the structure of the nondeformed section of the stress alleviating section of each link section. Incidentally, in this embodiment, since the nondeformed sections of the link sections 4, 5, 6, and 7 have a similar structure, only the link section 4 will be described as a representative example, and the description of the link sections 5, 6, and 7 will be omitted. Moreover, such components as are found also in the first embodiment described earlier will be identified with the same reference characters.

As shown in FIG. 13, in a stress alleviating section 421C of a link section 4C, a pair of nondeformed sections 4213C is provided. The nondeformed sections 4213C are spaced apart from each other in the Y-axis direction and are located on one axis line which is parallel to the Y axis. Also with the link section 4C structured as described above, it is possible to bend a first shaft section 42C locally at a line segment connecting the pair of nondeformed sections 4213C.

According to such a fourth embodiment, it is possible to obtain the same effects as those of the first embodiment.

Fifth Embodiment

Next, a fifth embodiment of the optical scanner of the invention will be described.

Figure 14:
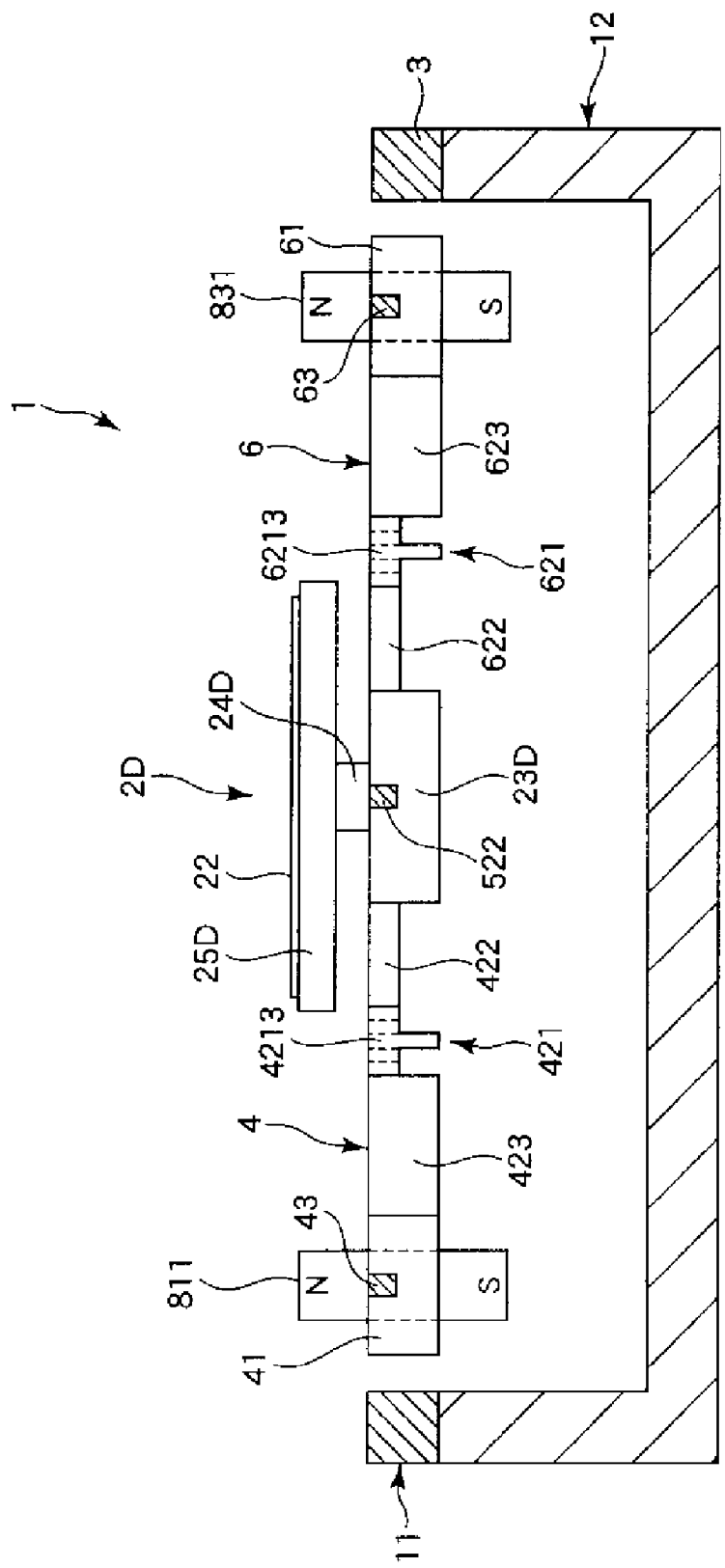
FIG. 14 is a sectional view showing a fifth embodiment of the optical scanner of the invention.

FIG. 14 is a sectional view showing the fifth embodiment of the optical scanner of the invention.

Hereinafter, regarding the optical scanner of the fifth embodiment, only differences from the optical scanners of the embodiments described above are explained, and the explanations of such matters as are found also in the embodiments described above will be omitted.

The optical scanner of the fifth embodiment is almost the same as the optical scanners described above except for the orientation of the vibration system and the structure of the movable plate. It is to be noted that such components as are found also in the first embodiment described earlier will be identified with the same reference characters.

As shown in FIG. 14, in this embodiment, the orientation of the vibration system 11 is opposite to that in the embodiments described above. That is, the vibration system 11 is provided so that the surface located on a side facing the pedestal 12 in the embodiments described above is located on a side facing away from the pedestal 12, and the surface located on a side facing away from the pedestal 12 is located on a side facing the pedestal 12.

Moreover, in this embodiment, a movable plate 2D has a base 23D connected to the link sections 4, 5, 6, and 7 and a light reflecting plate 25D fixed to the base 23D via a column section 24D. In such a movable plate 2D, a light reflecting section 22 is provided on an upper surface of the light reflecting plate 25D. By structuring the movable plate 2 as described above, it is possible to increase the area of the light reflecting section 22 while preventing an increase in the size of the optical scanner 1. This makes it possible to reflect the light as a thicker luminous flux by the light reflecting section 22, and makes it hard for the heat generated by the reflection of light by the light reflecting section 22 to be conveyed to the link sections 4, 5, 6, and 7, thereby preventing the thermal expansion of the link sections 4, 5, 6, and 7. From the viewpoint of preventing the heat from being conveyed to the link sections 4, 5, 6, and 7, the column section 24D may be formed of a material having good heat insulating properties.

Incidentally, the light reflecting plate 25D may have any shape and size as long as it does not interfere with the driving of the optical scanner 1. However, for example, it is preferable that the light reflecting plate 25D have a shape and size which allows the light reflecting plate 25D to be housed between the pair of nondeformed sections 4213 and 6213 in the X-axis direction and to be housed between the pair of nondeformed sections 5213 and 7213 in the Y-axis direction. This makes it possible to prevent, with reliability, any one of the drive section-side shaft sections 423, 523, 623, and 723 from making contact with the light reflecting plate 25D when the first shaft sections 42, 52, 62, and 72 of the link sections 4, 5, 6, and 7 bend.

Specifically, it is preferable that the planar shape of the light reflecting plate 25D be a circle having a diameter which is smaller than the distance between the pair of nondeformed sections 4213 and 6213, for example. Moreover, it is also preferable that the planar shape of the light reflecting plate 25D be a rectangle whose length in the X-axis direction is shorter than the distance between the pair of nondeformed sections 4213 and 6213 and length in the Y-axis direction is shorter the distance between the pair of nondeformed sections 5213 and 7213.

According to such a fifth embodiment, it is possible to obtain the same effects as those of the first embodiment.

Sixth Embodiment

Next, a sixth embodiment of the optical scanner of the invention will be described.

Figure 15:
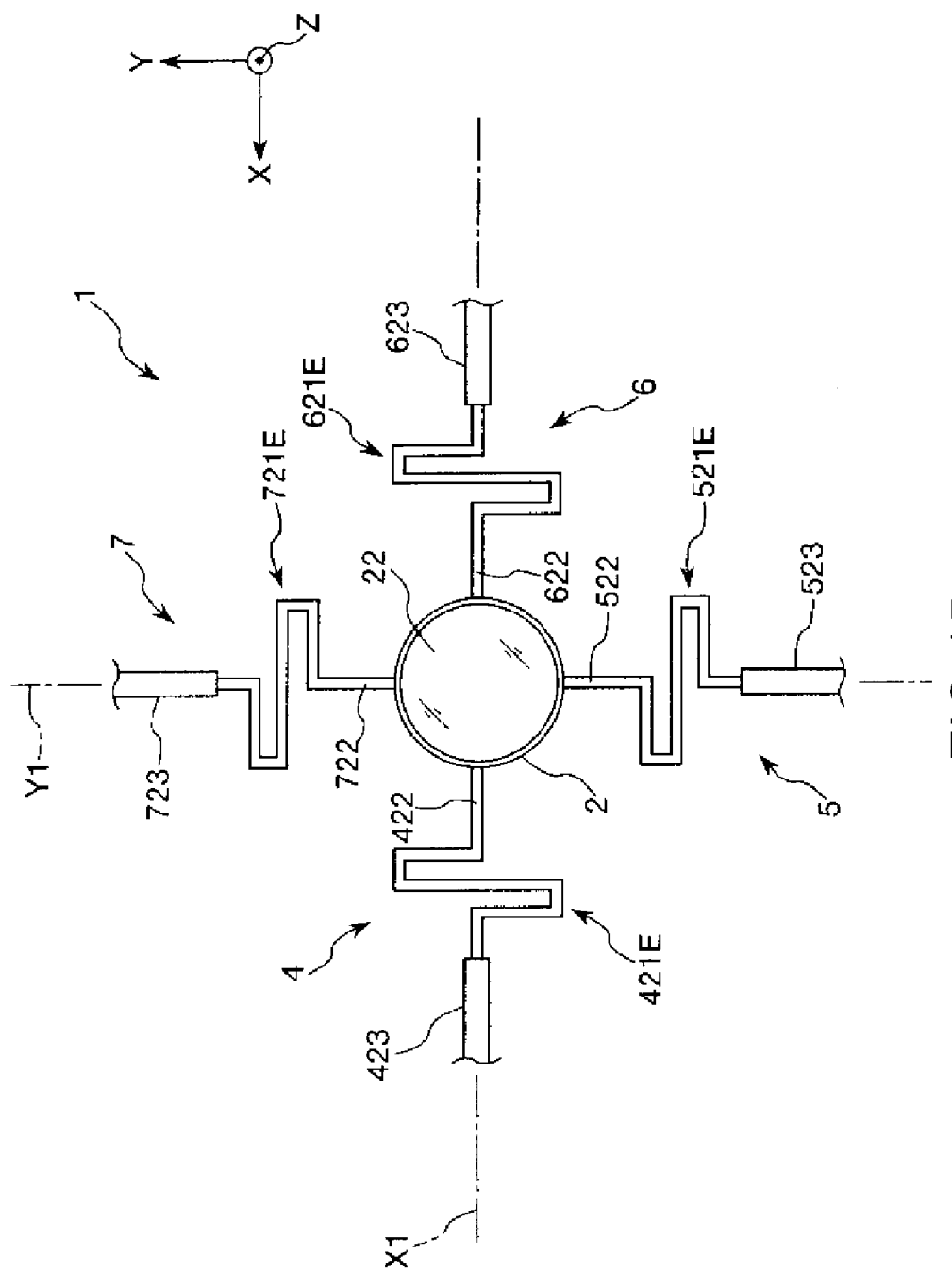
FIG. 15 is a plan view showing a sixth embodiment of the optical scanner of the invention.
Figure 16:
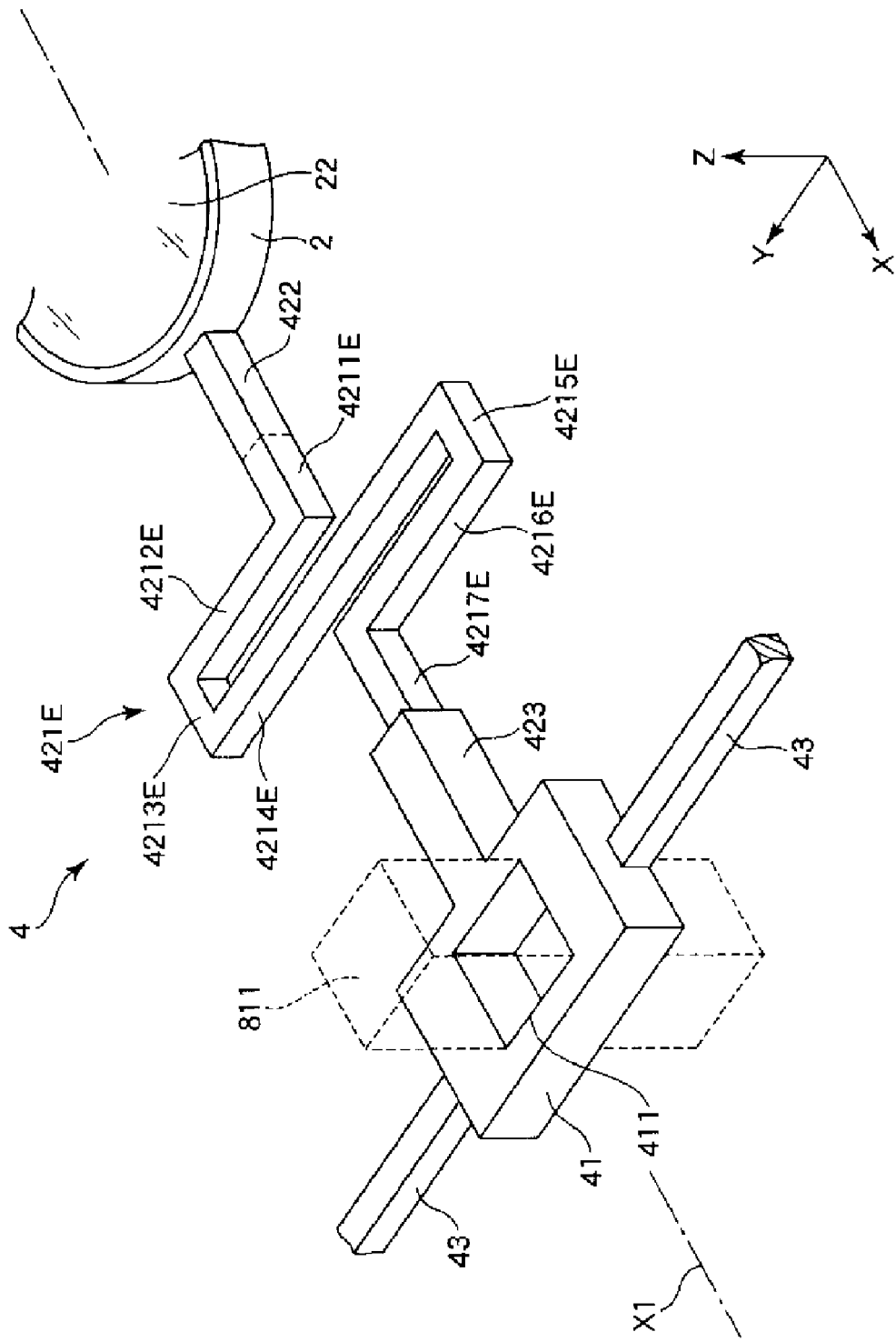
FIG. 16 is an enlarged perspective view of the link section of the optical scanner shown in FIG. 15.

FIG. 15 is a plan view showing the sixth embodiment of the optical scanner of the invention, and FIG. 16 is an enlarged perspective view of a link section of the optical scanner shown in FIG. 15.

Hereinafter, regarding the optical scanner of the sixth embodiment, only differences from the optical scanners of the embodiments described above are explained, and the explanations of such matters as are found also in the embodiments described above will be omitted.

The optical scanner of the sixth embodiment is almost the same as the optical scanners described above except for the structure of the stress alleviating section. It is to be noted that such components as are found also in the first embodiment described earlier will be identified with the same reference characters.

As shown in FIG. 15, the stress alleviating sections 421E, 521E, 621E, and 721E of the link sections 4, 5, 6, and 7 each have a meandering structure in which the stress alleviating sections 421E, 521E, 621E, and 721E extend in the X-axis direction and in the Y-axis direction alternately. Since these stress alleviating sections 421E, 521E, 621E, and 721E have a similar structure, only the stress alleviating section 421E will be described as a representative example, and the description of the other stress alleviating sections 521E, 621E, and 721E will be omitted.

As shown in FIG. 16, the stress alleviating section 421E has a first extending section 4211E connected to the movable plate-side shaft section 422 and extending in the X-axis direction, a second extending section 4212E extending from the end of the first extending section 4211E in the Y-axis direction, a third extending section 4213E extending from the end of the second extending section 4212E in the X-axis direction, a fourth extending section 4214E extending from the end of the third extending section 4213E in the Y-axis direction, a fifth extending section 4215E extending from the end of the fourth extending section 4214E in the X-axis direction, a sixth extending section 4216E extending from the end of the fifth extending section 4215E in the Y-axis direction, and a seventh extending section 4217E extending from the end of the sixth extending section 4216E in the X-axis direction and connected to the drive section-side shaft section 423.

The first extending section 4211E and the seventh extending section 4217E of the four extending sections 4211E, 4213E, 4215E, and 4217E extending in the X-axis direction are provided on the central turn axis X1 when viewed in an XY plane, and the third extending section 4213E and the fifth extending section 4215E are provided on opposite sides with respect to the central turn axis X1 when viewed in an XY plane (in a plan view of FIG. 15). Incidentally, it is preferable that the distance between the third extending section 4213E and the central turn axis X1 and the distance between the fifth extending section 4215E and the central turn axis X1 be equal to each other.

On the other hand, the fourth extending section 4214E of the three extending sections 4212E, 4214E, and 4216E extending in the Y-axis direction is provided so as to straddle the central turn axis X1 when viewed in an XY plane, and the second extending section 4212E and the sixth extending section 4216E are provided on opposite sides with respect to the central turn axis X1 when viewed in an XY plane. Incidentally, it is preferable that these three extending sections 4212E, 4214E, and 4216E be arranged at equal pitches in the X-axis direction. That is, it is preferable that the distance between the second extending section 4212E and the fourth extending section 4214E and the distance between the fourth extending section 4214E and the sixth extending section 4216E be equal to each other.

The seven extending sections 4211E to 4217E described above can be torsionally deformed about their respective central axes and can also be bent. For example, these seven extending sections 4211E to 4217E are formed of the second Si layer 130 shown in FIGS. 4A to 4C and FIGS. 5A to 5C in the first embodiment described earlier.

In such a stress alleviating section 421E, by making the extending sections 4211E to 4217E cause at least one of a torsional deformation and a curved deformation, it is possible to bend the first shaft section 42 at the fourth extending section 4214E and alleviate the stress produced by the torsional deformation of the movable plate-side shaft section 422.

This is the end of the description of the stress alleviating section 421E.

In this embodiment, the stress alleviating sections 721E, 521E, and 621E have a structure obtained by shifting the stress alleviating section 421E 90°, 180°, and 270°, respectively, in a clockwise direction in FIG. 15. That is, the stress alleviating sections 421E and 621E facing each other with the movable plate 2 placed between them are symmetric with respect to the movable plate 2, and the stress alleviating sections 521E and 721E facing each other with the movable plate 2 placed between them are symmetric with respect to the movable plate 2.

Incidentally, the stress alleviating section 421E has a structure in which seven extending sections extend in the X-axis direction and in the Y-axis direction alternately; however, the number of extending sections is not limited to seven. For example, there may be eleven or fifteen extending sections. However, of a plurality of extending sections extending in the X-axis direction, it is preferable that the number of extending sections located on one side with respect to the central turn axis X1 be equal to the number of extending sections located on the other side.

According to such a sixth embodiment, it is possible to obtain the same effects as those of the first embodiment.

The optical scanners described above can be suitably applied to an image forming apparatus such as a projector, a laser printer, an imaging display, a barcode reader, and a confocal scanning microscope. As a result, it is possible to provide an image forming apparatus with good drawing characteristics.

Specifically, a projector 200 shown in FIG. 17 will be described. Incidentally, for convenience of explanation, a longitudinal direction of a screen S is referred to as a "lateral direction" and a direction perpendicular to the longitudinal direction is referred to as a "vertical direction".

The projector 200 has a light source device 210 which emits a light such as a laser, a plurality of dichroic mirrors 220, 220, and 220, and the optical scanner 1.

The light source device 210 includes a red light source device 211 emitting a red light, a blue light source device 212 emitting a blue light, and a green light source device 213 emitting a green light. Each dichroic mirror 220 is an optical element which combines the lights emitted from the red light source device 211, the blue light source device 212, and the green light source device 213.

Such a projector 200 is so configured that the lights emitted from the light source device 210 (the red light source device 211, the blue light source device 212, and the green light source device 213) are combined by the dichroic mirrors 220 based on the image information from an unillustrated host computer, the combined light is two-dimensionally scanned by the optical scanner 1, and a color image is formed on the screen S.

At the time of two-dimensional scanning, the light reflected by the light reflecting section 22 is scanned in the lateral direction of the screen S (main scanning) by the turning of the movable plate 2 of the optical scanner 1 about the central turn axis Y1. On the other hand, the light reflected by the light reflecting section 22 is scanned in the vertical direction of the screen S (sub-scanning) by the turning of the movable plate 2 of the optical scanner 1 about the central turn axis X1.

Scanning of light by the optical scanner 1 may be performed by raster scanning described above or by vector scanning. Since the optical scanner 1 is particularly suitable for vector scanning because of the structure thereof, it is preferable to scan light by vector scanning.

The vector scanning is a method by which the light emitted from the light source device 210 is scanned on the screen S so as to form line segments sequentially, the line segments each connecting two different points on the screen S. That is, the vector scanning is a method by which an intended image is formed on the screen S by gathering minute straight lines. As described earlier, since the movable plate 2 can be displaced irregularly and continuously in the optical scanner 1, the optical scanner 1 is particularly suitable for such vector scanning.

Figure 18:
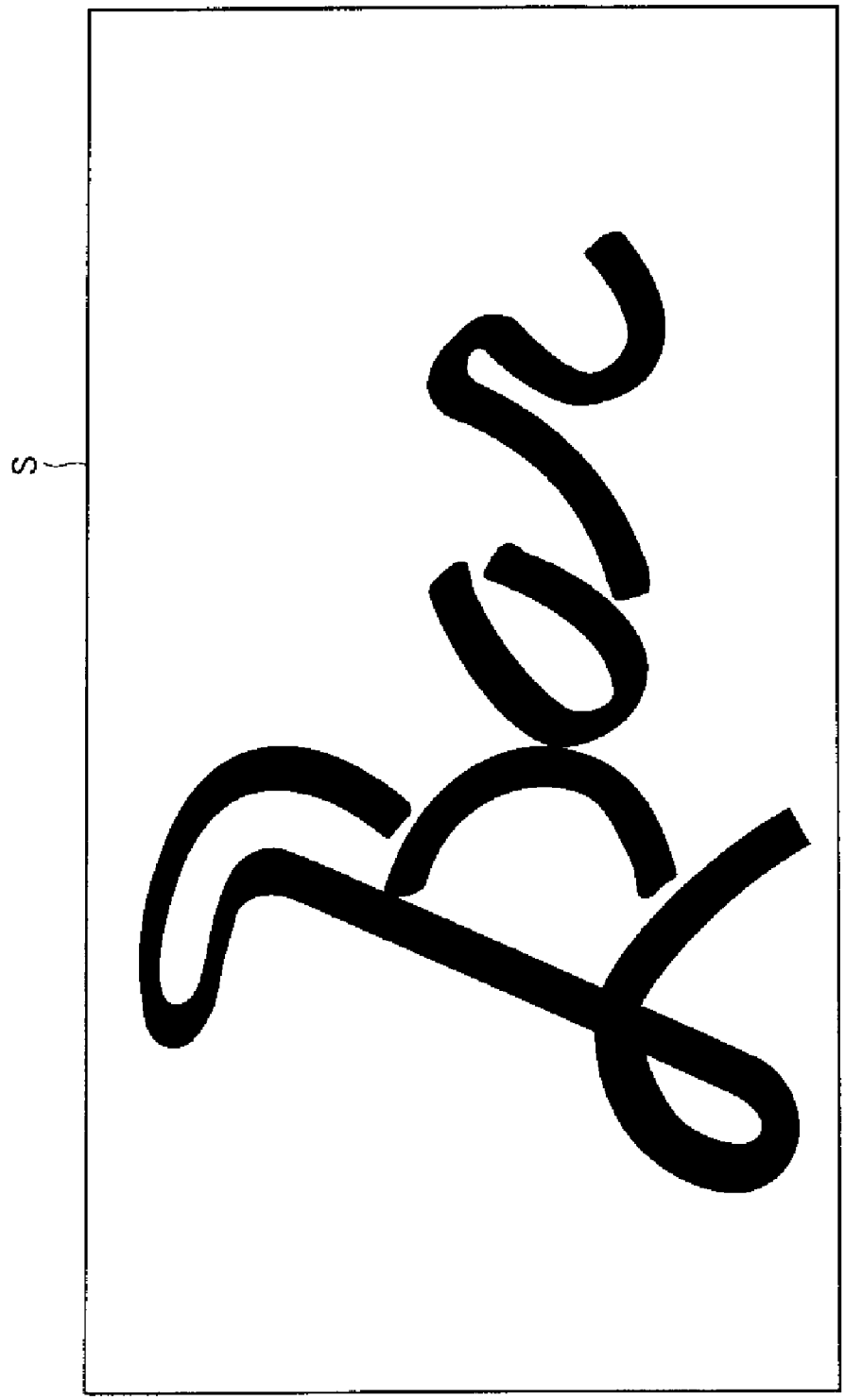
FIG. 18 is a diagram showing an example drawing performed by using the image forming apparatus shown in FIG. 17.

Specifically, when a group of letters shown in FIG. 18 is drawn by vector scanning, the light emitted from the light source device 210 is scanned so as to write each letter. At this time, by controlling the position (turning) of the movable plate 2 of the optical scanner 1 about the central turn axis X1 and the position (turning) thereof about the central turn axis Y1, it is possible to scan the light irregularly and draw the letters shown in FIG. 18 as if the letters are written without lifting a pencil from the paper. With such vector scanning, unlike raster scanning, it is not necessary to scan the light on the entire surface of the screen S. This makes it possible to draw an image efficiently.

Figure 17:
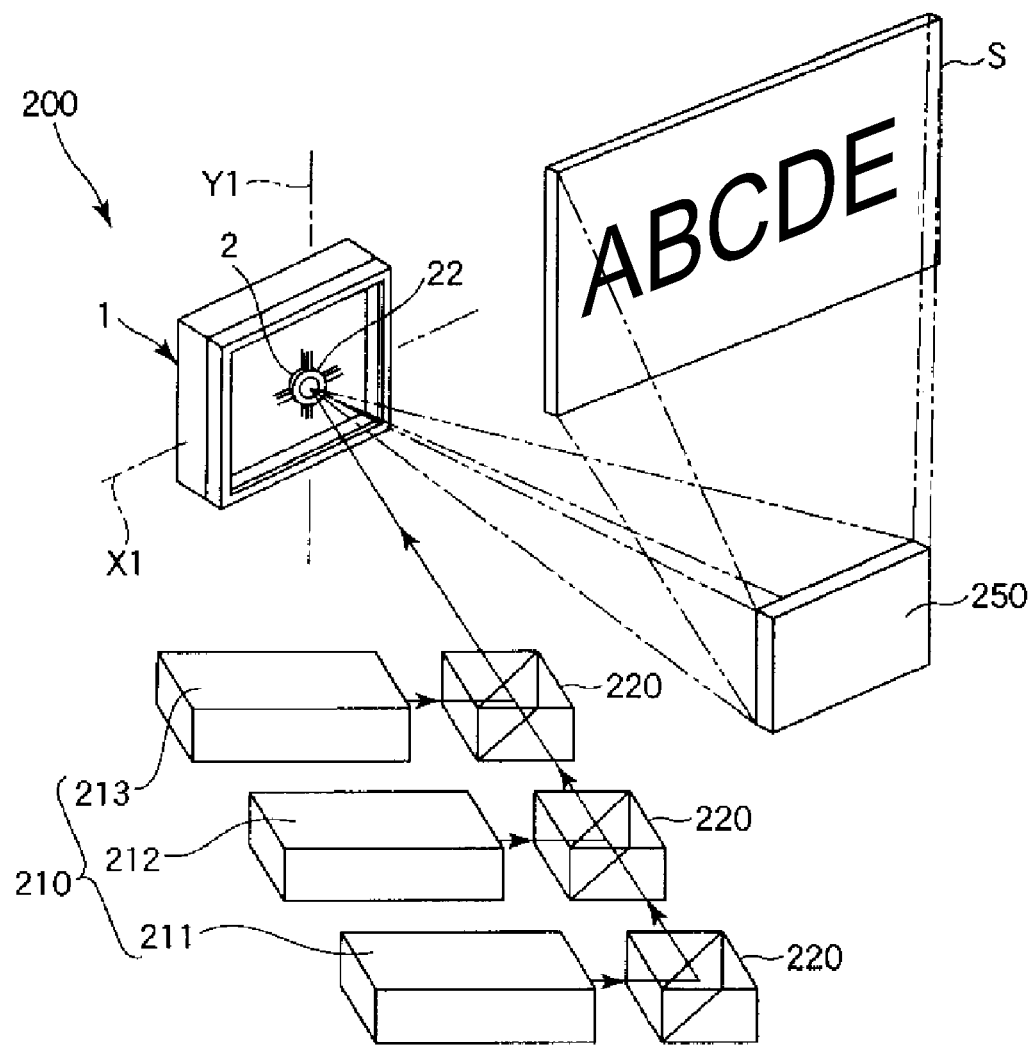
FIG. 17 is a diagram showing an outline of an image forming apparatus according to the invention.

Incidentally, in FIG. 17, after the light combined by the dichroic mirrors 220 is two-dimensionally scanned by the optical scanner 1, the light is reflected by a stationary mirror 250, and an image is formed on the screen S. However, the stationary mirror 250 may be omitted, and the light which has been two-dimensionally scanned by the optical scanner 1 may be directly shone onto the screen S.

Although the optical scanner and the image forming apparatus of the invention have been described by way of embodiments shown in the drawings, the invention is not limited to them. For example, in the optical scanner and the image forming apparatus of the invention, the structure of each section can be replaced with any structure with a similar function, and any component can be added. Moreover, for example, in the optical scanner of the invention, the embodiments described above can be combined appropriately.

Moreover, in the embodiments described above, as a structure of the displacement unit, a structure which adopts electromagnetic driving using a permanent magnet and an electromagnetic coil has been described. However, the structure is not limited to the above structure as long as the movable plate can be displaced in the manner described above. For example, as the displacement unit, electrostatic driving or piezoelectric driving may be adopted.

Furthermore, in the embodiments described above, a structure in which the first shaft section of each link section has a stress alleviating section has been described. However, the structure is not limited to the above structure, and the stress alleviating section may be omitted. That is, in the first shaft section of each link section, the movable plate-side shaft section and the drive section-side shaft section may be directly connected.

In addition, in the embodiments described above, a structure in which the drive section-side shaft section of each link section is virtually undeformed when the optical scanner is driven has been described. However, the structure is not limited to the above structure. For example, the drive section-side shaft section of each link section may be bent and deformed (curved and deformed) in the Z-axis direction.

Moreover, in the embodiments described above, by making the SOI substrate have different thicknesses in a part which is deformed and a part which is not deformed, the part which is deformed (a second shaft section, a movable plate-side shaft section, a deformation section, and a connecting section) and the part which is not deformed (a drive section, a drive section-side shaft section, and a nondeformed section) of each link section are formed. However, the structure is not limited thereto, and the part which is deformed and the part which is not deformed may be formed by making the SOI substrate have different widths in the part which is deformed and the part which is not deformed.

What is claimed is:

1. An optical scanner comprising:
a light reflecting section;
a movable plate provided to the light reflecting section;
four link sections connected to the movable plate; and
a supporting section supporting the four link sections,
the four link sections are provided on an outer circumference of the movable plate at 90-degree intervals along a circumferential direction of the movable plate in an X-Y plane view,
each link section includes:
a turnable drive section, and
a shaft section which connects the movable plate and the turnable drive section, the shaft section being bendable and deformable in a thickness direction of the movable plate by turning the turnable drive section, and
the shaft section including a stress alleviating section,
wherein the stress alleviating sections each have a pair of deformation sections, and
one of the pair of deformation sections is connected to a movable plate-side shaft section, and the other of the pair of deformation sections is connected to a drive section-side shaft section, and
the stress alleviating sections each have a non-deformable section provided between the pair of deformation sections, the non-deformable section extending in a direction parallel to an extending direction of the deformation section, and being torsionally non-deformable about a central axis thereof.

2. The optical scanner according to claim 1, the four link sections further comprise:
a first link section facing a second link section in an X-axis direction with the movable plate therebetween; and
a third link section facing a fourth link section in a Y-axis direction with the movable plate therebetween,
the X-axis direction is at a right angle to the Y-axis direction in an X-Y plane view of the movable plate,
the first link section and the second link section each have:
a first shaft section extending in the X-axis direction and connecting the movable plate and the turnable drive section so the turnable drive section is spaced apart from the movable plate in the X-axis direction, and
a second shaft section extending in the Y-axis direction and connecting the turnable drive section and the supporting section, and
the third link section and the fourth link section each have:
a first shaft section extending in the Y-axis direction and connecting the movable plate and the turnable drive section so the turnable drive section is spaced apart from the movable plate in the Y-axis direction,
a second shaft section extending in the X-axis direction and connecting the turnable drive section and the supporting section, and
the stress alleviating section included each of the first shaft section.

3. The optical scanner according to claim 2, wherein each of the first shaft sections of the four link sections is bent at the stress alleviating sections.

4. The optical scanner according to claim 3, each of the movable plate-side shaft sections of the four link sections is torsionally deformed about a central axis of the movable plate-side shaft section.

5. The optical scanner according to claim 3, the drive section-side shaft sections of the four link sections are substantially non-deformable relative to a deformability of the movable plate-side shaft sections.

6. The optical scanner according to claim 3, each of the stress alleviating sections of the four link sections has a deformation section extending in a direction perpendicular to an extending direction of the movable plate-side shaft section and the drive section-side shaft section in an X-Y plane view of the movable plate, the deformation section being torsionally deformed about a central axis.

7. The optical scanner according to claim 1, each of the stress alleviating sections of the four link sections has a plurality of extending sections extending in the X-axis direction and a plurality of extending sections extending in the Y-axis direction, and each of the plurality of extending sections is adapted to torsionally deform about a central axis and bend.

* * * * *